(12) United States Patent  (10) Patent No.: US 8,148,921 B2
Elberbaum  (45) Date of Patent: Apr. 3, 2012

(54) METHOD AND APPARATUS FOR PROPAGATING OPTICAL SIGNALS ALONG WITH POWER FEED TO ILLUMINATORS AND ELECTRICAL APPLIANCES

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 163 days.

(21) Appl. No.: 12/725,808

(22) Filed: Mar. 17, 2010

(65) Prior Publication Data

US 2011/0227510 A1    Sep. 22, 2011

(51) Int. Cl.
*H05B 37/00* (2006.01)
*G02B 6/36* (2006.01)

(52) U.S. Cl. .............................. 315/363; 385/76; 385/139

(58) Field of Classification Search ............... 315/185 S, 315/363; 362/184, 188, 353, 377, 378, 433, 362/437, 551, 554, 581; 439/607.2, 607.24, 439/620.2, 699.2, 825, 842; 385/54–58, 385/76, 77, 100, 139
See application file for complete search history.

(56) References Cited

U.S. PATENT DOCUMENTS

| | | | | |
|---|---|---|---|---|
| 4,215,276 A | * | 7/1980 | Janeway | 307/40 |
| 5,235,252 A | * | 8/1993 | Blake | 315/151 |
| 5,455,488 A | * | 10/1995 | Rhoades et al. | 315/156 |
| 5,923,363 A | | 7/1999 | Elberbaum | |
| 6,603,842 B2 | | 8/2003 | Elberbaum | |
| 6,940,957 B2 | | 9/2005 | Elberbaum | |
| 7,290,702 B2 | | 11/2007 | Elberbaum | |
| 7,639,907 B2 | | 12/2009 | Elberbaum | |
| 7,649,722 B2 | | 1/2010 | Thijs et al. | |
| 2004/0000816 A1 | | 1/2004 | Khoshnood | |
| 2006/0134990 A1 | | 6/2006 | Van Der Mee et al. | |
| 2008/0273295 A1 | | 11/2008 | Fabrizi | |
| 2009/0280677 A1 | | 11/2009 | Gingrich, III | |
| 2010/0053838 A1 | | 3/2010 | Elberbaum | |

FOREIGN PATENT DOCUMENTS

WO    2010/036431    4/2010

OTHER PUBLICATIONS

International Search Report and Written Opinion dated Aug. 8, 2011 from the corresponding PCT/US2011/020441.
U.S. Appl. No. 12/236,656, filed Sep. 24, 2008.
U.S. Appl. No. 12/632,108, filed Dec. 7, 2009.

* cited by examiner

*Primary Examiner* — Jacob Y Choi
*Assistant Examiner* — Jimmy Vu
(74) *Attorney, Agent, or Firm* — Katten Muchin Rosenman LLP

(57) ABSTRACT

In a method and apparatus for propagating optical signals via optical cables such as plastic optical fiber, known as light-guide joint and mingled with the electrical wiring and home automation system for controlling LED illuminators enclosed in standard screw type bulb bases or plug-in bases, such as used for halogen lamp via optical signal propagated through such standard bases. Same optical signals are propagated through power outlets and via power cable assemblies to electrical appliances for controlling the appliances operation and on-off switching. Full range of control, distribution, signal conversion, keypads and touch screen including video interphones monitors and shopping terminals operate and controls such home automation via the optical cables.

30 Claims, 11 Drawing Sheets

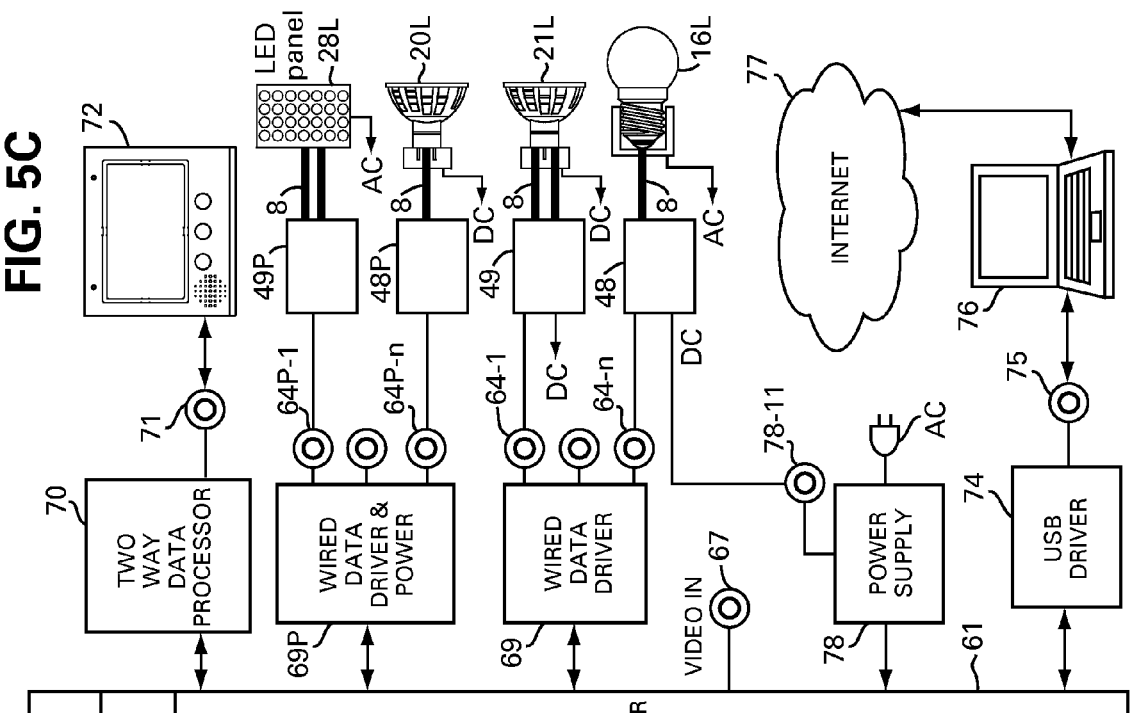
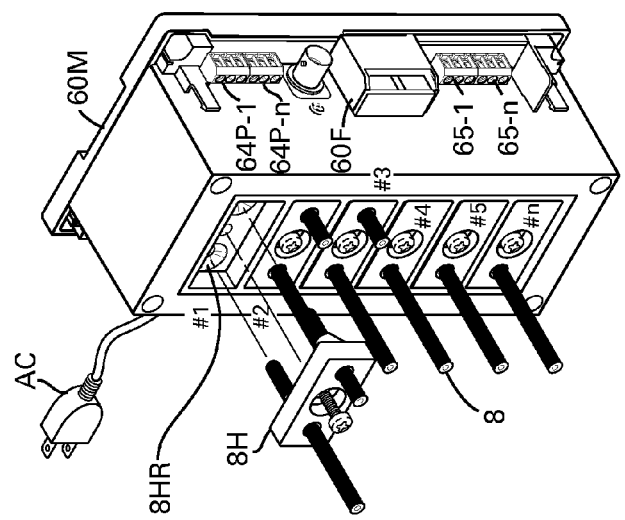
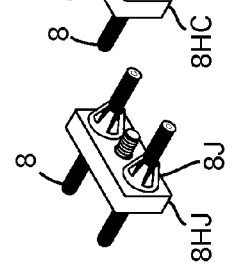

FIG. 10A
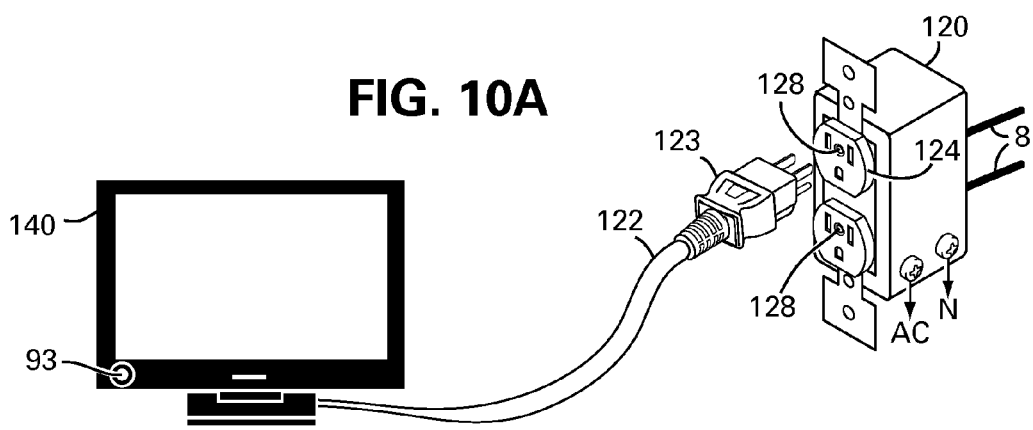
FIG. 10B
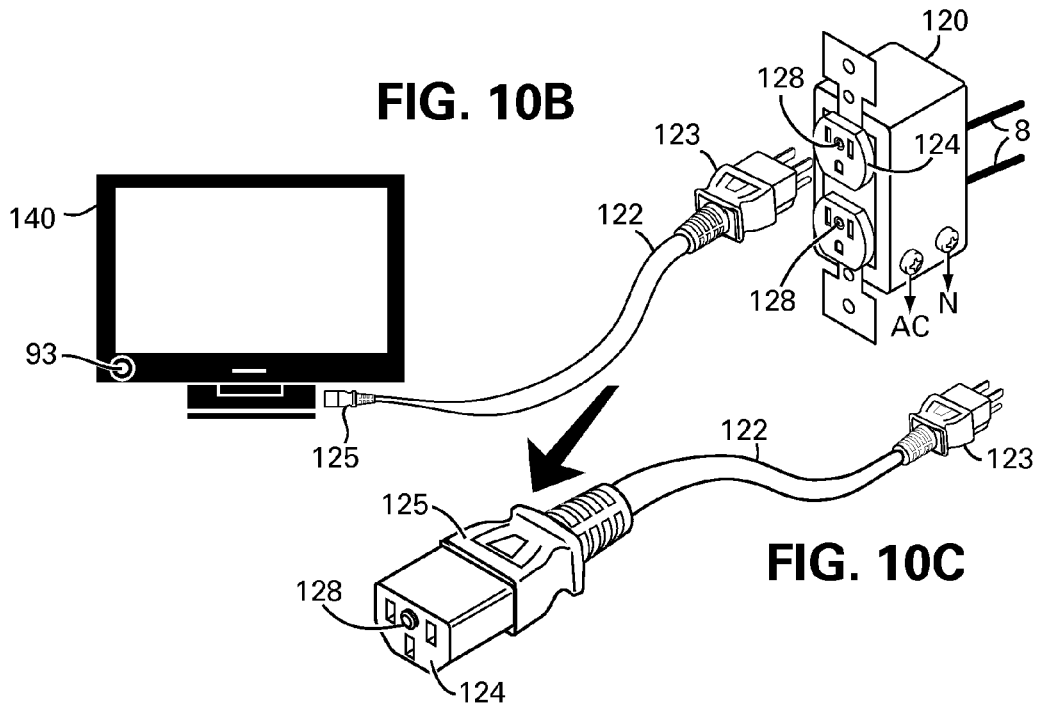
FIG. 10C
FIG. 10D
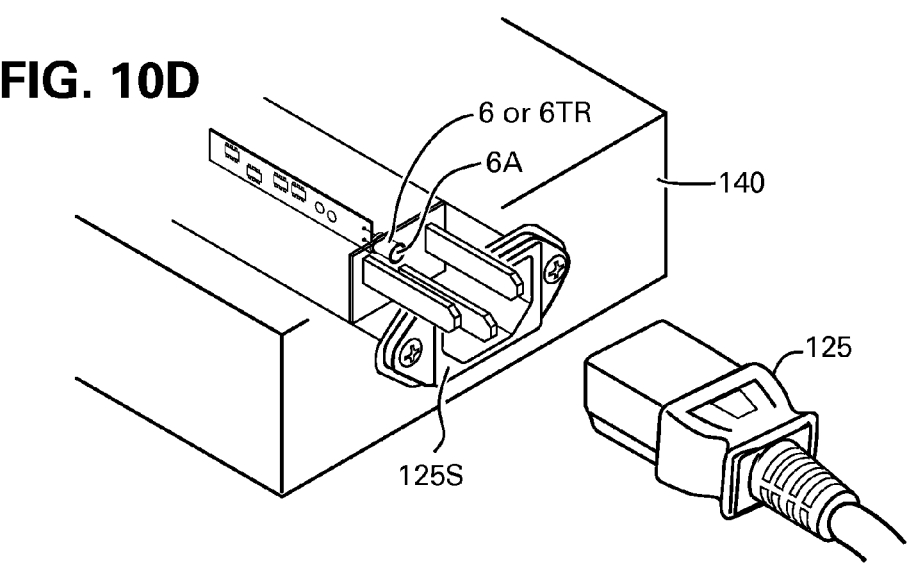

METHOD AND APPARATUS FOR PROPAGATING OPTICAL SIGNALS ALONG WITH POWER FEED TO ILLUMINATORS AND ELECTRICAL APPLIANCES

FIELD OF INVENTION

LED illuminators including AC powered LED illuminator, other AC or DC powered appliances, electrical outlets, lightguide and fiber optic cables, light and home automation controllers, switches and signal distributors.

BACKGROUND OF THE INVENTION

LED illuminators are operating on low voltages of 2V~5V with a given current drain such as 20 mA~50 mA. Some very bright LEDs will drain higher current, but none of the known LEDs can operate by applying standard AC power line such as 120VAC to the LEDs. To connect an LED illuminator directly to an AC power line, the power must be rectified and regulated to within the LED operating voltage and current levels.

The problem facing the present introductions of newly developed LED light devices is the need to integrate the LEDs into existing electrical AC line in apartments, homes, offices and other buildings. LED illuminators can be controlled in many ways, such as changing their light color, hue and brightness. They can be programmed to provide lighting scenes, such as candle lights and many more. For all such controlling scenarios, including brightness and color there is a need to propagate control signal to operate or switch on-off the LED and receive from the LED statuses, such as the current drain, the specific program in operation and others. Such one or two way control signals are difficult to propagate to the LEDs via the AC power line, particularly because the DC feed to the LED mandates the introduction of switching power regulators, that are noisy, choppy and disrupt the propagate signals. On the other hand, connecting a separate low voltage control line to an AC powered LED illuminator is prohibited by the electrical and building codes and therefore cannot be used.

Moreover, the commonly used light fixtures employ standard screw type socket as used globally for incandescent light bulbs or a standard two pin sockets as used for Halogen bulbs. None of the commonly used standard sockets is provided with terminals or pins for connecting a separate control line. This state is impeding the introduction of LED illuminators with control capabilities and/or limit such introductions to a specialized high priced LED illuminators. A simpler and lower cost solutions for controlling the LED illuminators, including the ON-OFF switching of the LEDs are needed.

SUMMARY OF THE INVENTION

The solutions for controlling the LED illuminators are achieved by the present invention through the use of lightguide and/or fiber optic cables that can be directly connected or attached to a standard AC socket of a light bulb for propagating control and command signals through a receiving access or opening in the base of an LED illuminator body. The use of lightguide and/or fiber optic cables for operating AC appliances, including lighting appliances and semiconductor packaged switches are disclosed in the U.S. application Ser. Nos. 12/236,656 and 12/632,108 and PCT/US2009/048376 and are incorporated herein by reference.

The transmission of a light, such as a light signal generated by a transmitting LED of a control device, to an LED illuminator via lightguides or optical fibers for switching the illuminator on and off is the main object of the present invention. This includes the simplicity in connecting lightguides to the LED illuminators and their sockets or holders for feeding the simple on-off commands and for more elaborated commands for communicating optical signals comprising visual light, UV or IR signals, thereby introducing new medium for lighting control and communications. The lightguides and the fiber optic cables offer the most efficient communication solutions including the need to insulate the control signals and cables from noises and disturbances within the electrical boxes and system is the other objective.

Further, the need to electrically insulate the signal cables from the power lines and devices that feed AC and/or DC power to illuminators, including power switches, light dimmers, AC socket and other AC and/or DC power devices is an absolute must. Mixing of low voltage control wires with power wires and devices are prohibited by the building and the electrical codes, and the use of lightguides, being a perfect insulator, is the other solution by the present invention.

Further such power devices may include an AC or DC current sensor or sensing circuit including semiconductor transmitter structure for outputting optical signal of a given current drain and state, such as on-off state, stand-by state or provide current drain levels data, such as disclosed in the above referenced U.S. patent application Ser. Nos. 11/939,785, 12/236,656, 12/632,108 and the U.S. Pat. No. 7,649,722.

Yet, another object of the present invention is to operate and monitor the state of lights and lighting appliances through a video interphones and/or "shopping terminals" and/or via a communication network including the generating of control codes and signals by the video interphones and shopping terminals or by other dedicated controllers for the different lighting appliances, using a driver circuits as described in the U.S. Pat. No. 7,649,722 or other driver circuits. "Shopping terminals" are disclosed in the U.S. Pat. No. 7,290,702. Video interphones systems are disclosed in U.S. Pat. Nos. 5,923,363, 6,603,842 and 6,940,957.

The terms photo, or opto, or optical relating to elements, parts, structure and techniques in the following description are one of the same.

The term lightguide coupler refers to a semiconductor circuit structure incorporating optical transmitter and/or optical receiver and/or photovoltaic cell including an optical access aligned with the optical receiver, or the optical transmitter or both. The structure may include (built-in) lightguide holder structure for introducing the lightguide or an optical fiber to the optical access, or such lightguide holder may be a separate structure for attachment to the coupler circuit.

The term live AC refers to the "hot line" of the AC power or mains, as opposed to the neutral line of the AC power or mains.

The term transmitter refers to an LED, laser or other optical emitting devices that transform electric signals into UV, IR or visual light signals.

The term transmitting refers to a UV, IR or visual light emission from a transmitter, in air such as from hand held remote control or into lightguides or optical fibers.

The term receiver refers to a photo diode, pin diode, photo transistor, CMOS, CCD or other photovoltaic or photoelectric receivers that convert UV, IR or visual light into electrical signals or electrical charge.

The term receiving refers to the receiving of UV, IR or visual light, in air in line of sight, such as from an hand held IR remote control, or via lightguides or optical fibers onto a bare surface of the receiver or via a transparent materials including prisms, half mirrors, lenses, filters and other optical structures.

The term transceiver refers to a combined transmitter and receiver including a transceiver embedded into a semiconductor package or attached to an optical prism for propagating two way optical signals through a single optical cable such as the lightguides or the optical fibers by deflecting or directing a received optical signal to the receiver and allowing the transmitted optical signal to pass into the optical cable. The term transceiver includes a transceiver that propagates two way optical signals via two optical cables.

The term optical prism refers to a structure for deflecting and/or separating two way optical signals (the received and the transmitted optical signals) propagated via the prism and via a single lightguide or optical fiber. Said prism comprises an optical device selected from a group of polarizing optical filters, given visual wave length pass filters, visual bandpass filters, given wave length UV pass filters, given wave length IR pass filters, given wave length UV cut filters, given wave length IR cut filters, half mirrors with a given reflectance values and combinations thereof, wherein said filters and/or said half mirrors form said prism or are attached to said prism and/or are coated onto said prism and/or are introduced into the prism material in the form of a tint, particles or a process. Further details of a prism structure disclosed in the U.S. patent application Ser. Nos. 12/236,656 and 12/632,108 are incorporated herein by reference.

Even though an UV, IR or visual light is recited individually in the following descriptions, the UV, IR and the visual light term may refer to all. The term light, UV, IR or visual light is used alternately to an optical signal and should not be restrictive to the one or the other, unless it is so described.

The terms controller or control device refer to a system controller that controls light switches, illuminators and other devices via a control line, known as low voltage or bus line, for propagating one way or two way commands and communications. The control line may feed a low power such as 12 VDC to the devices. The controller also propagates optical signals (light, UV, IR or visual light signals) for communicating with the AC or DC illuminator switches and directly to the illuminators body or to an illuminator socket that include one or two way optical communication circuits and holders for lightguides or optical fibers. The term low voltage line refers to the controller's control line.

The term current sensor refers to a DC current sensor for detecting a DC current drain through a DC power line and/or an AC current sensor for detecting the AC current drained through an AC power line wire or through a switching device, including detection by induction such as disclosed in the above referred to U.S. Pat. No. 7,649,722 and U.S. patent application Ser. Nos. 11/939,785, 12/236,656, 12/614,468 and 12/632,108 and/or for generating current drain state via one way or two way optical signal.

The method and apparatus for propagating signals between control devices and LED illuminators for remotely operating AC or DC powered LED illuminators and other objects of the present invention are attained by introducing a lightguide or optical fiber between the lightguide transmitter and receivers or between transceivers of the present invention. Such as between a low voltage controller that receives and transmits electrical command and communication signals and uses a lightguide coupler or a lightguide converter of the present invention for converting the signals into optical signals, for communicating one or two way UV, IR or light signals, including on-off commands to operate lighting and other appliances via a lightguide or optical fiber cables.

The lightguide coupler of the present invention can be introduced to any type of lighting and other appliances and LEDs illuminators used in homes, residences, offices, shops, restaurants, halls, factories and other establishments, indoors or outdoors, for controlling the lighting and the appliance via a lightguide or optical fiber cable. And to receive optical signal confirming the power current drain from the connected appliance through returned optical signals, such as on or off state or standby state or a given ongoing illumination program from the lighting appliance.

The current drain or the on-off state data is sent in response to the received operational command, such as on-off, or in response to an inquiry command (a request for data) on the basis of the current sensor output, thereby providing error free remote controlling of lighting appliances.

The introduction of lightguide and/or fiber optic cables directly to LED lighting and appliances applies to a whole range of lighting devices and their sockets or holders and to power sockets and plugs including power cable assemblies of the different electrical appliances including televisions and other A/V appliances. The example of the long over 100 years well established screw type light bulb holder, that became the global standard bulb base and socket, is one of the problems that need to be solved.

The screw type bulb holder cannot be connected physically to any type of wired control signal line. This is because the bulb is inserted into the socket by rotation, wherein the threaded body of the bulb is one terminal for the lighting element and the other terminal is the center surface at the back of the base, which is commonly a soldered surface. This makes it impossible to add to such bulb base structure and its socket additional terminals or connections for control wires.

However as shown and explained hereafter, it is simple to introduce a lightguide cable into the center of a bulb socket and a lightguide coupler with its optical access at the center of the rear surface of the bulb base, wherein the direct feed of one or two way signals are perfectly attained by such attachment of an LED illuminator structured into a light bulb with a threaded screw type base.

Similarly it will be possible, as shown and explained hereafter to insert and attach lightguide into the center of a socket of an halogen shape structured LED illuminator including a lightguide coupler with an optical access built into a rear body of such halogen bulb shaped LED illuminator.

Once the optical signal for illuminators control are becoming common and standard, any future LED illuminator structure, be it illumination panels, or boxes or other structures and assemblies, can all be incorporating a low cost lightguide coupler and be controlled by optical signals of the present invention, providing wholly insulated cables and fire free solutions and provide the basic and the environment for future lighting and electrical appliances control medium, at low cost.

Further, the current drain and other data that are fed in return to a power-on command to confirm that the illuminator or other appliance is switched on, is a perfect solution for real time controlling of energy consumption, and for providing energy management. By such return confirmation the home automation controller, the video interphone or the shopping terminal are updated at all times with the illuminators and other appliance's "on state", or "off state" when the command was to switch off the appliance.

The reference to home automation controller hereafter is to a panel with control keys or touch screen and/or remote control devices and circuits similar to the video interphone and/or the shopping terminal disclosed in the US patents and the pending US applications referred to above.

BRIEF DESCRIPTION OF THE DRAWINGS

The foregoing and other objects and features of the present invention will become apparent from the following description of the preferred embodiments of the invention with reference to the accompanying drawings, in which:

FIGS. 5A and 5B are perspective views of the home automation and light control distributor and the lightguide plugs for attachment to the distributor;

FIG. 5C is an electrical block diagram of the home automation distributor of FIG. 5A and the system interconnections with the video interphone and the use of command converters for controlling and operating the LED illuminators of the preferred embodiment of the present invention;

FIGS. 10A~10D are perspective views of television appliances connected via molded power cables to a power outlet of the present invention including the power socket of the television with its optical receiver access;

DETAILED DESCRIPTION OF THE PREFERRED EMBODIMENTS

Figure 1A:
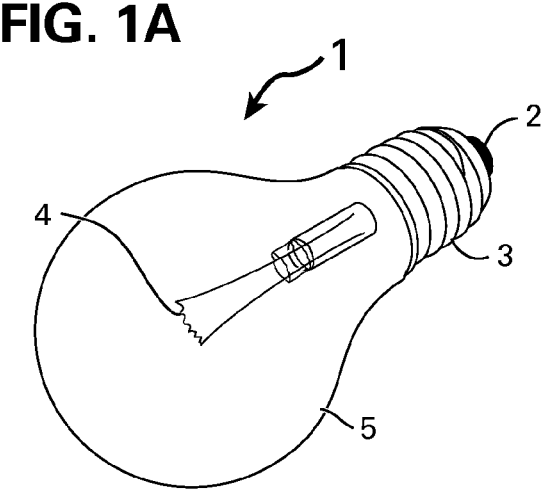
FIGS. 1A, 1B and 1C are perspective views and a cross sectional view respectively of a typical light bulb and socket.
Figure 1B:
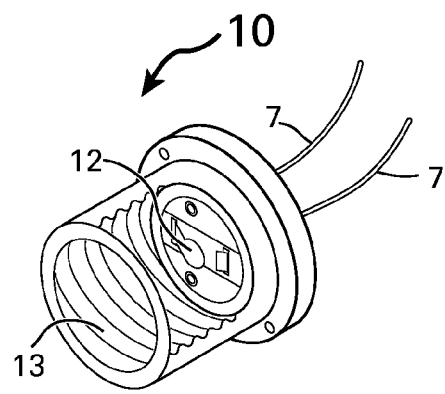
Figure 1C:
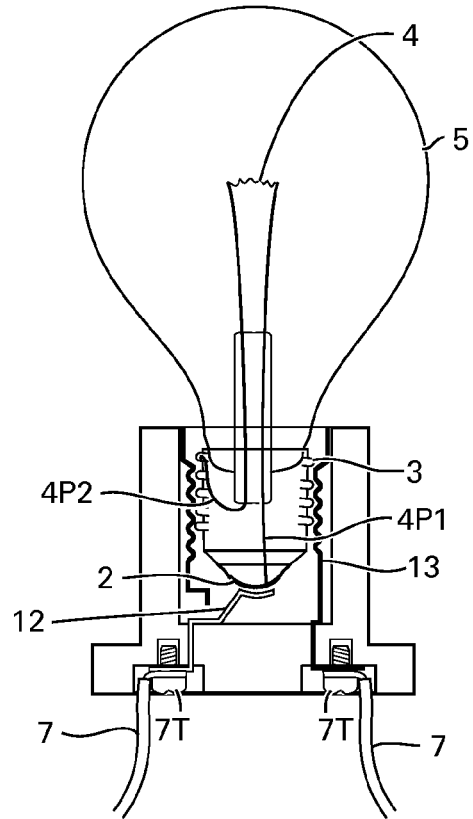

FIG. 1A shows a typical light bulb 1 comprising the well known screw type base 3 with a rear terminal 2, encapsulated in a glass bulb 5 and a lighting filament 4 connected to its threaded base and rear terminal or contact 2 via internal connections 4P2 and 4P1. FIG. 1B shows a well known socket and holder 10 for the light bulb 1 including the threaded socket 13 and the rear contact 12, both connected to the power wires 7 via the terminals 7T shown in FIG. 1C.

The attaching of the bulb 1 to its socket and holder 10 is processed by the well known screw-in action or the rotating of the bulb clockwise into the socket 13 until the rear terminal or the rear surface 2 touches the contact 12 inside the socket 10. As shown in the sectional drawing of FIG. 1C the inner structure of the threaded socket 13 and the rear terminal 12 are such that it will be literally impossible to add terminals for connecting a separate control line to the LED illuminator 1L that is constructed into a standard bulb and base shown in FIG. 1D.

To connect a low voltage control line into such threaded socket may require, for example, three contact rings (not shown) to replace the rear contact 2. One of the rings is for feeding the AC power and the two other rings for the low voltage control line. The insulation between such rings will be very thin and hazardous, and moreover, electrical and building codes prohibit such connections combining AC power and low voltage control line in the same AC socket. Such prohibiting code is proper, because if someone, by error for example, will insert a regular light bulb into such three rings socket, it may short the live AC to the low voltage contacts, thereby introduce live AC into the low voltage lines and may cause injury or death by electrifying the entire low voltage control line with live AC.

On the other hand, the option to use wireless control and/or control via the AC lines, even though theoretically possible, in practice, each and every LED lighting device requires addressing and address setting, while the persisting power line noises including the noises created by the switching regulator that are used for LED illuminators made for AC direct operation, and their clipping and chopping of the power makes such individual lighting control via RF signals and/or via the AC power line non practical. Some may still do so, but such systems will be very complicated and costly to set, operate and maintain.

Figure 1D:
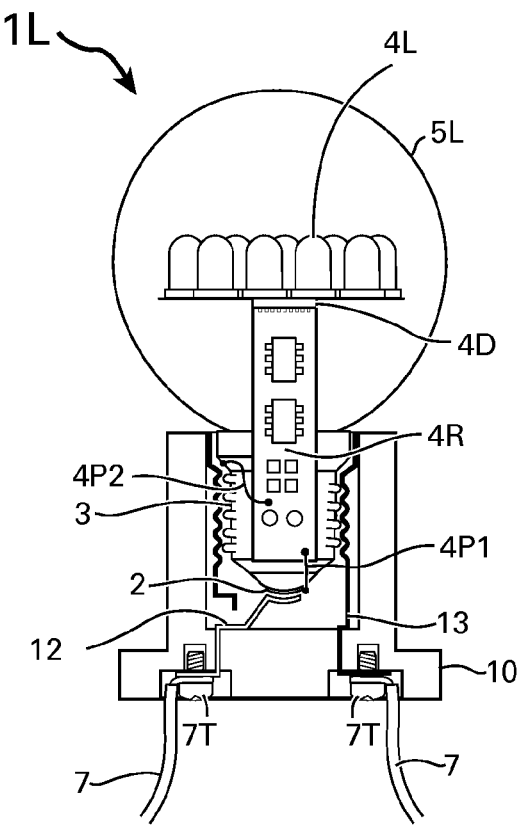
FIG. 1D is a cross sectional view of an LED illuminator constructed in a light bulb shape and base.
Figure 2A:
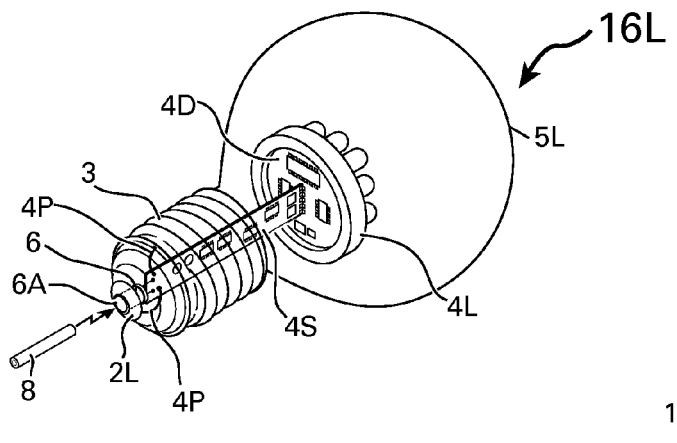
FIGS. 2A~2D are perspective views and cross sectional views of the lightguide attached to a socket shown in FIG. 1B and a lightguide coupler included in the LED illuminator of the present invention.

FIG. 2A shows the rear view of the LED illuminator 16L that includes a lightguide coupler 6 or 6TR in its base and optical signal access 6A in the center of its rear contact or surface 2L for receiving one way optical control signal or for exchanging two way optical signals with the lighting controller or the home automation controller. The shown threaded base 3 is the same threaded base of the light bulb 1 shown in FIG. 1C and the LED illuminator 1L shown in FIG. 1D, while the rear contact 12L of the socket shown in FIG. 2A is structured with a cutout 12A in its center portion to provide an optical access for the optical signals to pass through.

The LED illuminator 1L shown in FIG. 1D is shaped and constructed with a bulb and a base substantially identical or similar to the light bulb 1. The differences are in the lighting element, the inner circuits and the materials used. The light bulb 1 is constructed of glass material because the filament 4 is heated to high temperatures, while the LED illuminator including the bulb 5L is made of plastic materials, because its power dissipations is far lower and it does not heat to high temperatures. The light producing elements are the well known light emitting diode arrays or LEDs 4L mounted on a driver PCB 4D that includes the LEDs current control circuits and its power is fed from a rectifier and regulator PCB assembly 4R. The PCB 4R is internally connected to the threaded base body 3 via the wire 4P2 and to the rear terminal 2 via the wire 4P1 for connecting the AC power line feed through the socket 10 and the power wire 7. The LED illuminator 1L operates when AC power is applied through the wires 7, via a switch, similar to the incandescent lamp 1.

Figure 2B:
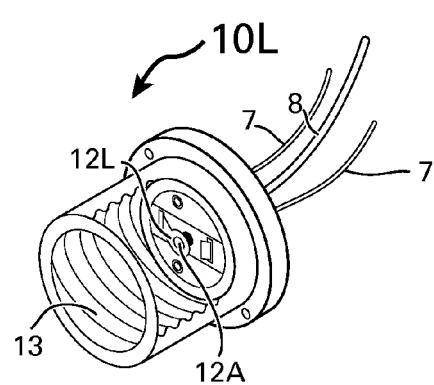
Figure 2C:
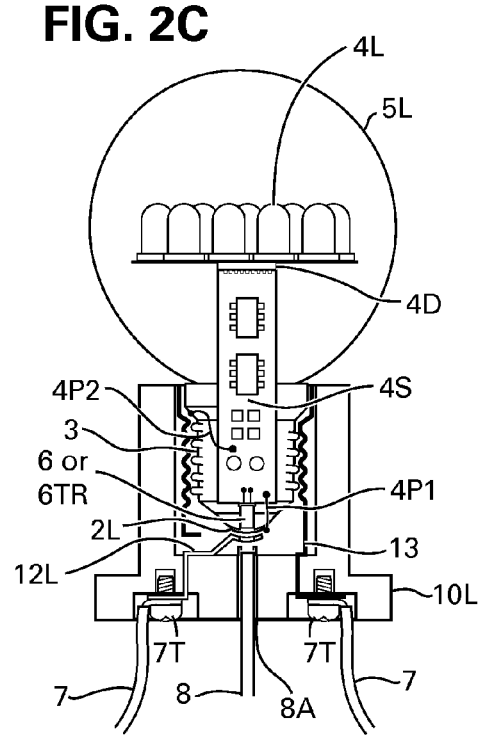

The LED illuminator 16L shown in FIGS. 2A and 2C as referred to above, includes a lightguide coupler 6 or 6TR (transceiver) in the center of its base for receiving optical signals through an access 6A and through an access 12A of the rear terminal 12L of the socket 10L shown in FIGS. 2B and 2C. The lightguide coupler 6 shown is a photo transistor or pin diode for receiving a command such as on, or off, or a dimming command for reducing the brightness or changing of the color of the LED illuminator. The switching on-off commands as will be explained later can be the propagation of coded commands that include addressing, or it can be a simple transmission of a continuous light signal via the lightguide 8, for example the LED illuminator 16L will switch on when light is present and fed to the lightguide coupler 6 and will switch off when no light is fed from the lightguide 8.

Because light dimming and brightness control are attained by operating the LEDs via train of pulses, dimming the LEDs on the basis of the pulse rate, pulses width and pulses level, such control can simply be attained by transmitting via the lightguide such train of light pulses. Such varying control pulses may further include the propagating of a given wavelength in the visual light signal (400~700 nm) for providing an expanded command references on the basis of the light color of the signal and/or extending the light signal spectrum to the UV range (below 400 nm) and/or to the IR range (700~950 nm), using low cost LEDs as the light signal transmitter of the control devices, shown in FIGS. 5~8.

Figure 3A:
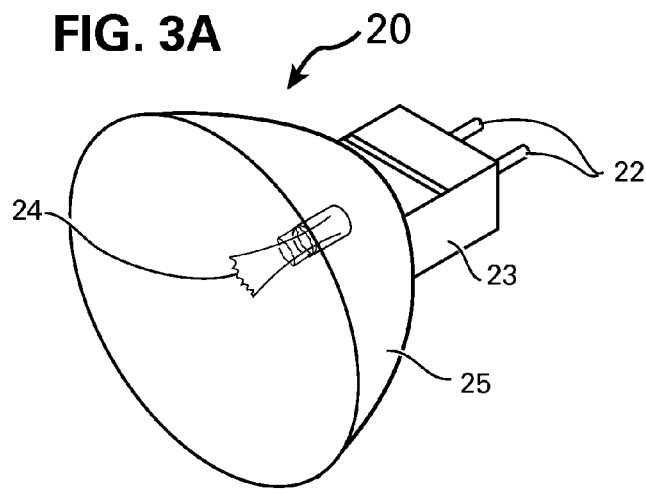
FIGS. 3A and 3B are perspective views of a typical halogen light bulb and a socket.
Figure 3B:
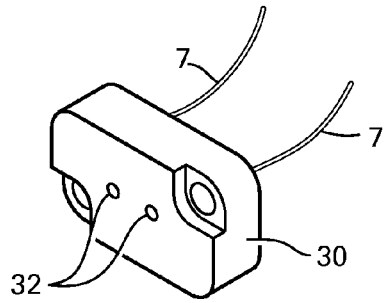
Figure 3C:
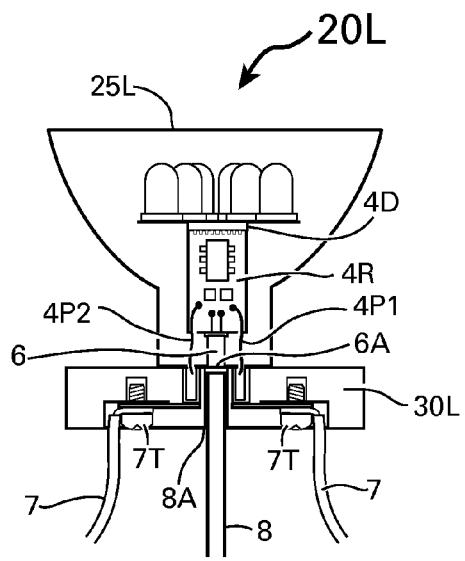
FIGS. 3C~3F are perspective views and a cross sectional view respectively of an LED illuminator in a typical halogen light bulb shape, with its socket adapted to attach one or two lightguides to one or two accesses of a lightguide coupler of the present invention.

FIG. 3A shows a typical halogen light bulb 20, comprising its well known 2 pin plug 22 and base 23, encapsulated in a glass bulb 25 with its filament 24. FIG. 3B shows the well known halogen socket 30 and its contacts 32 connected to power wires 7. Unlike the threaded light bulb 1 the halogen bulb 30 shown is plugged into its socket 30, such as the LED bulb 20L shown in FIG. 3C. The electrical circuits 4R and the driver 4D of the LED illuminator 20L in halogen shaped bulb are identical or similar with the circuits of the LED illuminator in a standard bulb 1L. The circuits basically employs a rectifier for the AC powered illuminators, and a voltage regulator 4R and a driver 4D to control the current fed to the LEDs. In the case of powering the LED illuminators by a DC power the rectifier may not be necessary, and some illuminators may not include the voltage regulator, alternatively the driver circuit may include current regulating diodes instead.

Depending on the control signal structure and content, a central processing unit (CPU) of the LED illuminator may be used to process the received signals for its operation. Alternatively, when the signals for operating the LED illuminators are a continuous light transmission and/or a pulse train transmission to control the LED brightness, the CPU may not be needed and not used. The circuits details are discussed later, but regardless of the circuits, the type of and the content of the control signal used, it is clear that LED illuminators structured into a base and a bulb, similar to a base and/or a bulb used for incandescent or halogen lights, can be linked via a lightguide cable by introducing a lightguide holder and access into light sockets that are similar to the standard socket, as globally used for light fixtures, for propagating optical control signals to operate and control the LED illuminator.

Many other shapes and structures of LED illuminators such as LED panels, strips, reflector bulbs, candelabra bulbs, decoratives and other specialty structure LED illuminators can all be made to connect to a power line via a base or a plug and a socket and be controlled via a lightguide or fiber optic cable via an optical access included in the socket or via a separate holder for attaching the lightguide, such that it will propagate its optical signal through an optical access, to a lightguide coupler of an LED illuminator.

Further, LED illuminator that is not attached to its socket by screw rotation, such as the LED illuminator 16L of FIG. 2A, can use dual lightguides one for receiving commands from a controller and one for returning optical signal to the controlling devices. LED illuminator such as 16L and any other LED illuminator can communicate two way optical signals via single lightguide.

As will be explained further below, the two way signals via the lightguides can be propagated via a single lightguide, using prisms, pass filters, or via other optical directing elements and different wavelength optical transmissions, or via a combined semiconductor transceiver package, including optical receiver and transmitter.

Yet, it is similar simple to propagate operating commands to an LED illuminator, such as on-off-dim-change to color "n", or change to program "n", via one (receiving) lightguide and transmit via a second lightguide a confirmation and current status, such as standby, off, on, dim and the like. Since LEDs of the LED illuminators are DC operated, it is simple to tap on the LED driver for current drain information and feed the CPU of the illuminator with data, or drive an LED transmitter to switch-on when current is detected and switch-off when no current is detected.

Figure 3D:
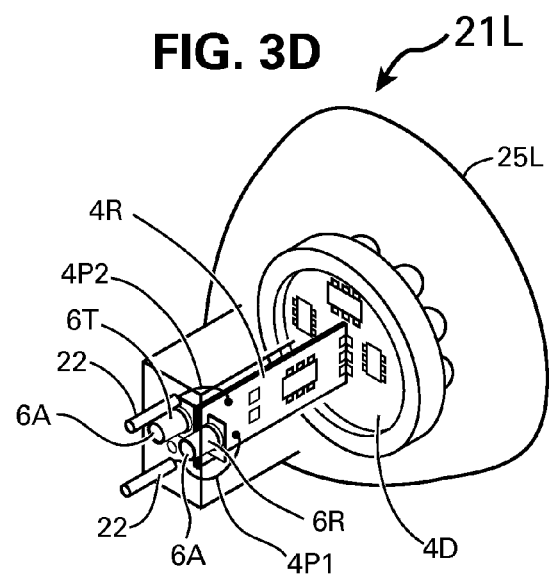
Figure 3E:
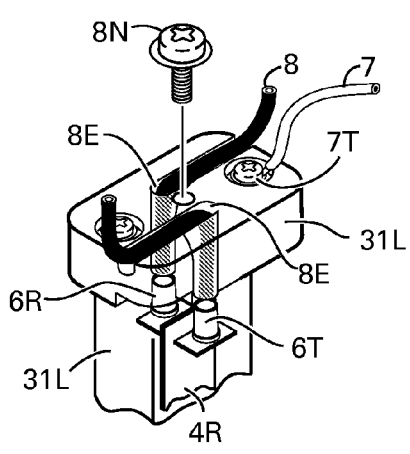
Figure 3F:
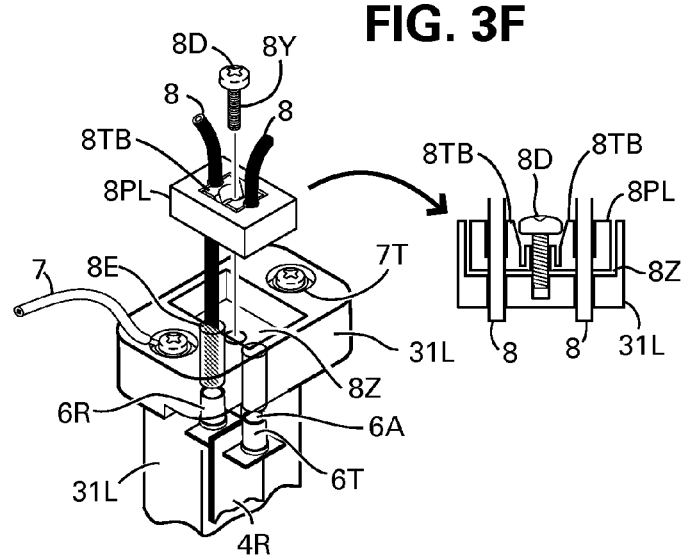

Shown in FIG. 3D is an LED illuminator 21L in a structure similar to the halogen bulb and base 20 shown in FIG. 3A and with two lightguide couplers, a receiver 6R for receiving operation command and a transmitter 6T for generating a returned data, both are accessed through dual accesses 6A to dual lightguides 8 attached to the socket 31L, shown also in FIGS. 3E and 3F.

The bulb socket 31L, unlike the bulb socket 30L, provides for attaching two lightguides, secured by a single screw 8N, into their entries 8E, which are aligned with the lightguide couplers 6R and 6T of the LED illuminator 21L of FIGS. 3D and 3E.

FIG. 3F shows another attachment and fastening structure and method via a tightening pressure applied onto two pressured tabs 8TB of a lightguide plug 8PL by the head 8D of the screw 8Y against the dual lightguides 8, as further illustrated in the cross sectional illustration of the 8PL assembly. The screw 8Y that tightens the tabs 8TB onto the lightguide cables 8 also locks the plug 8PL into the indented or the receptacle space 8Z.

Figure 4A:
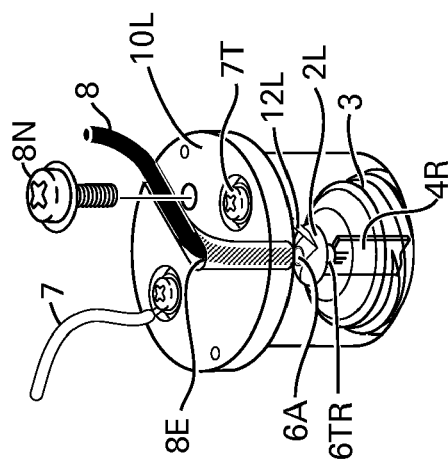
FIGS. 4A~4F are perspective views illustrating the attaching of the lightguide to a bulb socket shown in FIG. 2B and into one or two way accesses of lightguide couplers of the preferred embodiment.
Figure 4B:
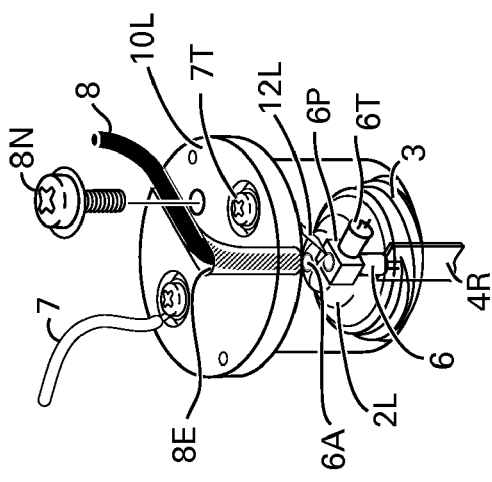
Figure 4C:
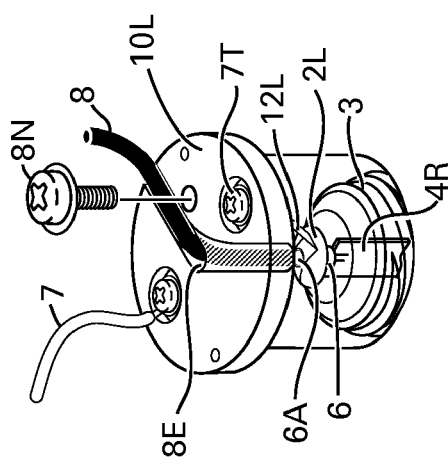

Shown in FIGS. 4A~4F are the many different attachments and support for the light guides and fiber optic cables 8 offered by the present invention. These include the cables 8 insertion into a cable holder 8H and into the cable sockets 8S shown in FIGS. 5A and 5B and the simple cable insertions and locking/securing shown in FIGS. 4A~4F, using a single screw 8N, or the molded tabs 8T. FIGS. 4A~4C illustrate the simplicity of the installation/connections of the preferred embodiment of the present invention. The light guides or fiber optic cables are simply cut, inserted into the single entry 8E, bended into the groove 8G and held/secured into place by the single screw 8S, while in FIGS. 4D~4F the locking into place is by the molded tabs 8T.

Figure 4D:
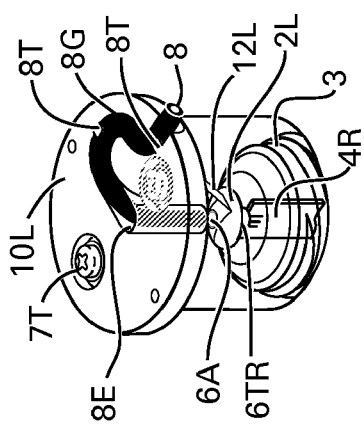

FIG. 4A and 4D show the attachment and the fastening of the lightguide 8 to the rear of the socket 10L. Both FIGS. 4A and 4D show the back portion of a base of an LED illuminator 16L with one way command propagation via the lightguide 8 to a photo or optical receiver 6. The lightguide 8 in FIG. 4A is fastened and secured by the screw 8N into its entry 8E, which leads the lightguide 8 towards the optical access 6A. FIG. 4D shows a similar socket 10L to the one shown in FIG. 4A but with the lightguide 8 secured into a groove 8G by a pair of tabs 8T, which hold the lightguide cable 8 tightly in place.

Figure 4E:
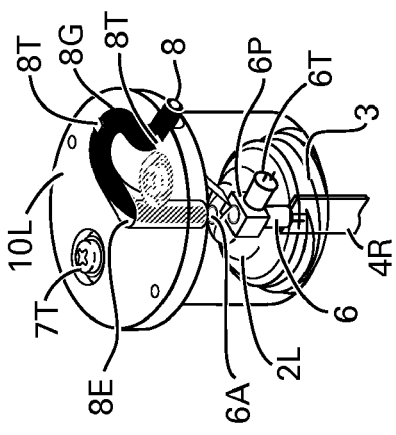
Figure 4F:
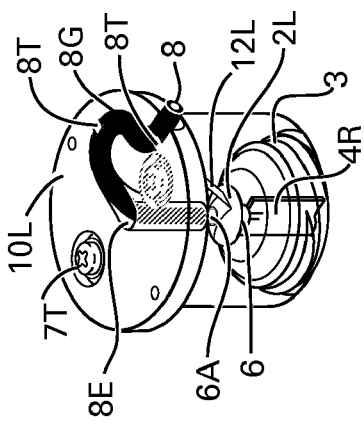

FIGS. 4B and 4E show the same attachment structures of FIGS. 4A and 4D respectively, but propagating two way communications via the prism 6P attached to an optical receiver 6R and optical transmitter 6T. FIGS. 4C and 4F, which also provide the attachments of FIGS. 4A and 4D respectively, propagate two way optical communications signals via a transceiver lightguide coupler 6TR, which is a packaged semiconductor incorporating an optical receiver and an optical transmitter. Many other attachments and fastening structures shown in the U.S. patent application Ser. Nos. 12/236,656 and 12/632,108 are incorporated herein by reference.

The terms lightguide and optical fiber referred to above and hereafter are similar or one of the same. Lightguides and optical fibers propagate light by total internal reflection based on the principles of light propagation and the propagation calculations thereof apply to both terms. In practice however the terms are used for different cable structure, materials and thickness or the diameter of the fiber core and its cladding. Therefore, even though the two terms are repeated above and hereafter as such, the term "optical fibers" or "fiber optic cables" above and hereafter and in the claims, refer also to "lightguides" and to cables known as "Plastic Optical Fiber" (POF) and/or to optical fiber cables having thicker cores for propagating more light.

Optical fibers used for high speed communications ever long distances and around the globe consist of three types, step index fiber, graded index fiber and single mode. The core diameter of the step index fiber is 200 µm, it can be used in low speed communication and over short distances of few hundred meters and it is rarely used currently. The popular fibers are the multi mode cables or the graded index fiber, having core diameter of 50 µm or 64 µm, even though some with thicker core diameter of 100 µm are available. The multi mode fibers are used for distances of up to 1 km or 2 km. The fiber used for high speed communications over long distance is the single mode fiber having core diameter of 8 µm (less than 10 µm) enabling the propagation of optical signals over tens and hundreds kilometers.

While multi mode fiber use LEDs for generating optical signals the single mode fiber uses only higher costs lasers for its optical signal generation. Moreover, the very thin cores of both the multi mode and the single mode fiber require high precision fiber terminations and connectors, all of which are costly and time consuming to fit during installation, wiring and assembling.

Another important item of the multi mode and single mode fiber is that the amount of light they propagate is very small because of the microns (micrometer) size of the fiber core. For this same reason the multi mode and single mode fibers require highly sensitive and costly receiving elements such as the known high-speed pin diodes with transimpedance amplifiers.

The thicker core lightguide (1.0~1.2 mm) also termed plastic optical fiber (POF) are used extensively for lighting in medical equipment, such as invasive and non-invasive fiber scopes for taking organ pictures. The thicker optical fibers belong to the step index fiber types, having higher attenuations, of up to 0.5 dB/m and limit the use of lightguides to a practical length of 100 m for slow speed of few kb/sec.

The larger core diameter however propagates more light and therefore can be used with low cost photo resistors, photo diodes, photo diacs, photo transistors, photo triacs, CMOS, CCD and photovoltaic cells. Because of the large diameter of the core (up to 2.0 mm or more/0.1 inch) the accuracies of aligning the lightguide to the receiver's photo sensitive surface does not require the micron accuracies that are critical for the single mode or the multi mode optical fiber connectors. Same applies to the LEDs (transmitters) that feed the optical signal into the lightguides. The mating of the LED with a lightguide does not require severe accuracies either, micron accuracies are not critical for the position of the lightguides to access the light emitted by the LEDs.

The thicker core lightguides and plastic optical fibers propagate more light onto the receivers having larger optical photo sensors surfaces and therefore do not require the super high sensitivity and high cost receivers and transmitters used with multi mode and single mode optical fibers. Same applies to the connectors, lightguides do not require highly accurate connectors, the lightguides can be attached to semiconductor packages including receivers, transmitter and transceivers without connectors altogether, or with a simple mechanical Snap-On connector or cable holder for locking the cable end to the optical access of a semiconductor.

Another advantage is the core lightguide's plastic material, PMMA or perfluorinated polymers, a softer material that is terminated by a cut, using sharp knife or guillotine style cutter, requiring no further lapping or polishing. The soft core provide for sharp bending of lightguides, into radiuses as small as 5 mm (0.2 inch), which is very useful in apartments and buildings with the many partitions and walls forcing the installers to bend the cables repeatedly throughout. This is in clear contrast to the silica, or other glass materials based optical fibers that are harder, require lapping and polishing of the cable ends, the fitting of expensive accurate connectors and require softer bending into radiuses no smaller than 50 mm (2 inch) that pose no difficulties in long stretched communication networks, but it will be literally impossible to connect multi mode or single mode fiber optic cables to switches inside crowded, standard wall electrical boxes.

Further, lightguides and plastic optical fibers are designed to propagate visual light in contrast to the optical fibers that propagate IR signals having wavelengths in the 850 nm, 1,350 nm and over 1,550 nm bands, none of which are visible. Even though lightguides propagate wide optical signals spectrum (from UV to IR) the lightguide's peak propagation, or the least attenuated wavelength is the 650 nm or the red light region. This enables the use of low cost high brightness red LED elements as the transmitters for transmitting optical control and communication signals to and from a controller, to and from a control signal converter and between lightguide couplers.

From the above descriptions it should be clear that the use of lightguides and plastic optical fiber or optical fibers having cores with larger diameter in homes, residences, office, small workshops, restaurants, factories, halls, and other building and institution with cable stretches, in walls or along the walls, in the range of 100 m (330 feet) ~200 m (660 feet) long for low speed communications, will be far cheaper as compared with the use of the multi mode and the single mode optical fibers that are used for high speed communications, involving precision and high cost throughout.

Shown in FIGS. 5A and 5C is the home automation system distributor and power supply 60M. A similar distributor and power supply is also disclosed in the pending US applications. The system distributor 60M block diagram of FIG. 5C shows the two way communications between the video interphone monitor 72 via two way data processor 70, which processes audio, video, alarm, home automation and data two way for enabling, among others, to communicate between a PC 76 via the USB driver 74 and through the Internet 77 with the home owner at, for example, his office or from other places.

Outside the audio, video, alarm and data that is fed to the home owner through its video interphone system, he can also review the status of and the energy used by the home automation, the lighting and the electrical appliances. The owner can further command and operate or switch off any or all of the lights and/or the appliances at will. The distributor and power supply 60M further provide for connecting video camera or the output of a CCTV video system selector into the input 67, thereby providing the owner of the house a video review of the house interior and/or exterior, particularly during alarm.

The shown low voltage wired data driver 69 and the wired data driver and power 69P are fully explained in the pending US application and are shown here for illustrating how to connect the protocol converters 48 and 48P via a single lightguide 8, and 49 or 49P via dual lightguides 8 into the system. The command converters 48P and 49P communicate with and are fed with power from the data driver 69P via terminal 64P, while the protocol converters 48 and 49 are shown powered individually via the DC power terminal 78-11 of the power supply 78 and from another DC power outlet that may feed also the illuminator 21L respectively and communicate with the data driver 69 via terminals 64.

The block diagram of FIG. 5C shows five plus n RX-TX receiver/driver circuits 65 including a well known driver IC 65T, a receiver IC 65R, and the optical transmitter (LED) 6T and receiver (photo transistor or diode) 6R or the transceiver 6TR, for feeding optical commands and receiving statuses and data via lightguides or fiber optic cables 8. The TX-RX circuits 65 are shown as assembled circuits, however as disclosed in the U.S. patent application Ser. No. 12/632,108 the entire optical TX-RX elements with the driver and the receiver comprising the circuit 65 can be integrated into a single lightguide coupler IC, for example into a well known transparent package, such as used for 3 mm diameter LEDs. Thereby the entire circuit can in practice be a small structure such as an LED with four leads or terminals, with its top or side being the access for the lightguide propagated optical signals.

The same TX-RX integrated IC circuits 65 are used throughout the home automation systems for converting, propagating and processing two way optical signals including the lighting control devices, such as command converters, switches-controllers, relays, switches, LED illuminators, keypads, video interphone or shopping terminals, dedicated controllers, outlets, sockets and plugs, current sensors, command repeaters, IR drivers and more.

FIG. 5 shows two TR-TX circuits 65 (#1~#2) for attaching dual light guides 8, two RX-TX 65 (#3 and #4) include transceiver 6TR and two or more (#5 and #n) include prism 6P, for attachment to a single lightguide or fiber optic cable 8.

The illustration of the system distributor and power supply 60M of FIG. 5A shows similar arrangement wherein the #1 and #2 accesses are used for dual lightguides 8, while #3~#n are used for attaching a single lightguide 8, but any other combinations can be applied, including such as for example, attaching only a single lightguide cables 8 to all the optical accesses or ports. The distributor 60M can be used for one way optical signal propagation, such as commanding the LED illuminator one way (no status is sent back), or for example only for receiving current status.

FIGS. 5A and 5B show yet another plug and socket for attaching the lightguides 8 to a lightguide coupler accesses, that could be termed as optical ports. FIG. 5B shows two type of plugs, 8HJ that locks the lightguide cable by vising the jaws 8J onto the cable 8 when the plug is locked into a tapered indentation in the receptacle 8HR. The other plug 8HC is provided with two collard hollow pins 8CL for bonding or crimping two lightguides cables 8 to the pins. Both plugs 8HJ and 8HC are sized and structured to fit the receptacle space 8HR of the distributor 60M panel shown in FIG. 5A. Further details, drawings and explanations of the distributor 60M are disclosed in the pending US application and patents referred to above and are incorporated herewith by reference.

The protocol and command converters 48, 48P, 49 and 49P are shown attached via single and dual lightguides 8 to the illuminator 16L, 20L, and 21L and to an LED illumination panel 28L, which is similar in its rectifier, power regulator, control and drive circuits to the circuit of the LED illuminators disclosed above, but its optical access is provided separately from its power plug and socket.

Figure 6A:
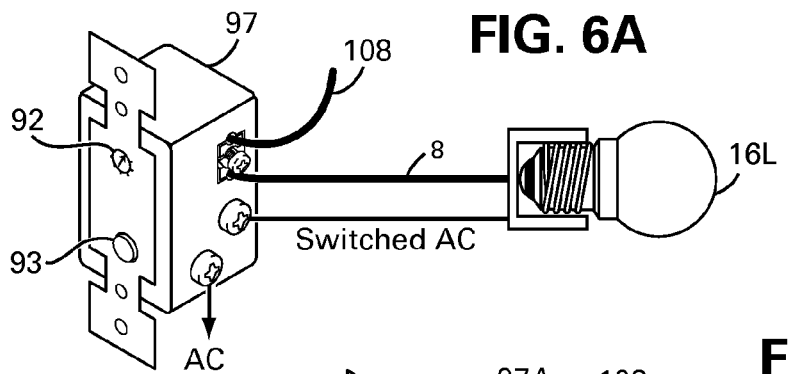
FIGS. 6A~6D are perspective views of basic connections for control and operation of each LED illuminator via a lightguide and via a switch-controller of the present invention including the remote controlling via hand held remote control unit.
Figure 6B:
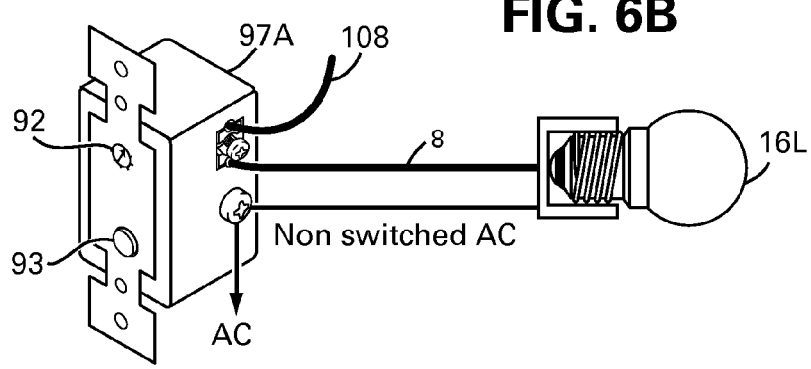

FIGS. 6A and 6B show a basic control and switching devices 97 and 97A for operating the LED illuminators of the present invention. The controller and switch 97 is powered by the AC power line and include control circuit for propagating control commands and receive returned data via the lightguide cable 8, similar to the transmit and receive circuits 65 of the distributor 60M of FIG. 5. The controller and switch 97 includes a power switch such a relay, or an OCMOSFET, or a TRIAC to switch on and off the power to the illuminator 16L. The rotary switch 92 is used for addressing the illuminator and its program selection, but it may not be necessary and not use if, for example, when the command "on" is a simple switch on of the transmitter LED 6T to feed continuous light through the lightguide 8, or transmit a train of pulses to control the dimming level of the illuminator 16L the rotary switch 92 is not used and is unnecessary. The push or touch key 93 is used to switch on and off and/or dim the illuminator step by step, such as by repeatedly touching the key.

FIG. 6B shows a similar controller 97A but with no on-off power switching. The on-off switching is programmed into the driver circuits of the illuminator 16L and the AC power is applied permanently to the LED illuminator 16L shown or to the other LED illuminators, with the on-off and/or other controls are executed via the optical control commands fed via the lightguide 8. The switching "on" command by the transmitting LED 6T of the controller 97A, may be a coded command or the feed of continuous light through the lightguide to switch on the illuminator 16L, or feed train of pulses to control the brightness or the dimming of the LED illuminator 16L or of the other LED illuminators.

Figure 6C:
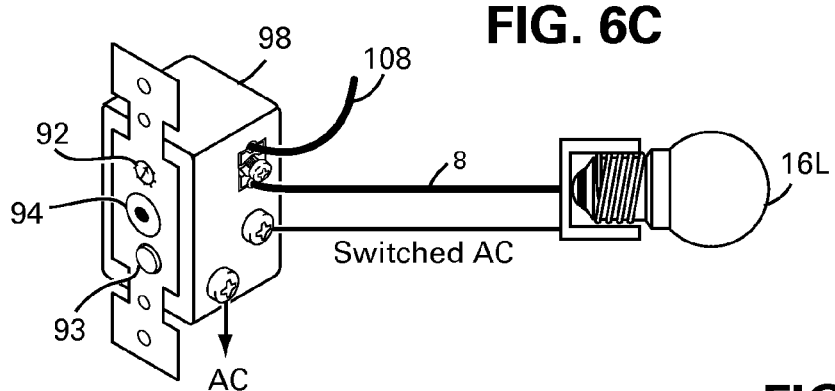
Figure 6D:
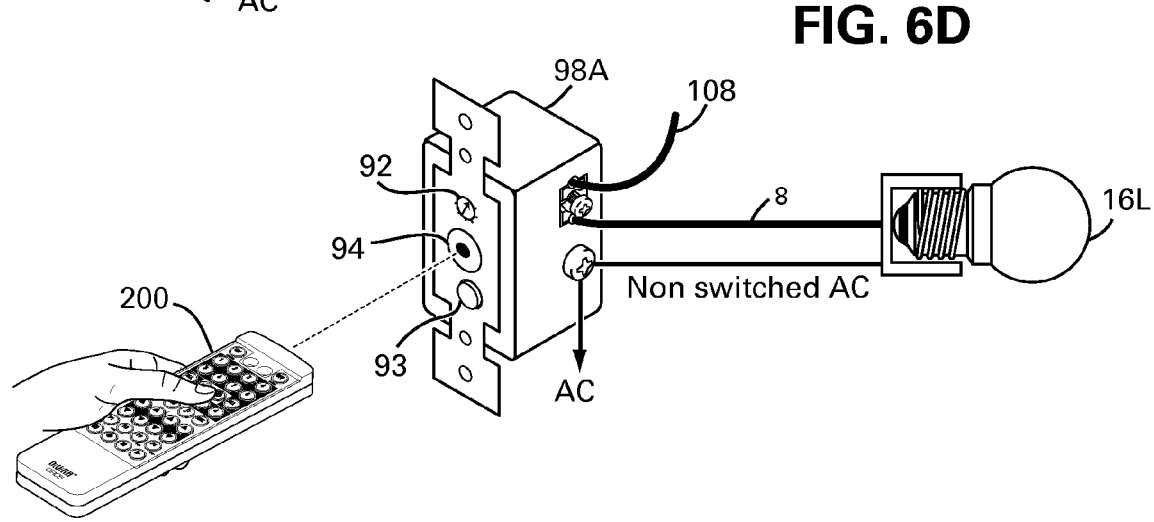

FIGS. 6C and 6D show a similar switch-controller 98 and a non-switching controller 98A, both include IR receiver 94 to receive commands from the shown IR remote control 200 for operating the LED illuminator 16L or other illuminators. The shown remote control unit can be RF remote control unit 200RF and the shown IR receiver 94 can be replaced by an RF antenna for providing RF wireless remote control instead.

The lightguide 108 shown in FIGS. 6A~6D are not needed in a stand alone setup and are not used for the individual setups shown in FIGS. 6A~6D. However, for a larger control systems the switches-controllers 97, 97A, 98 and 98A include two or more lightguide couplers (only two are shown) to propagate and exchange two way commands and statuses with other controllers shown in FIG. 7. The lightguides 108 and 8 are identical lightguides and are differently numbered for simplifying the disclosure. The two shown lightguide cables 8 and 108 can be used for dual lightguide attachment such as shown for the LED illuminator 21L of FIG. 5C.

The shown push or touch key 93 can be replaced by a toggle, a slide, a rotary, a lever, a pad or any other key or knob type for operating the controller 97, 97A, 98 and 98A and the illuminator 16L or other illuminators and/or the switch-controller itself. The single lightguide 8 shown connecting the switcher-controller to the LED illuminator 16L, can be used for one way continuous feed of light transmission to switch on, in accordance with the program of the LED illuminator 16L and other illuminators.

The difference between the controllers 97 and 97A or 98 and 98A is the AC switching, whereby all the switcher-controllers may feed continuous light via the lightguide 8 (on-state) or the continuous feed of light pulses, or train of pulses to control the illuminator dimming level, or generate and propagate a string of coded commands, the switch-controllers 97 and 98 will also switch off-on the AC power feed. To switch the illuminator 16L for example off, the controller 97A or 98A cuts the feed of light signal transmission via the lightguide 8, or propagate a coded "off" command while the switcher-controllers 97 and 98 will switch the AC power off.

The optical two way signal can be propagated to the LED illuminator 16L via a single lightguide 8 shown or via two lightguides 8 and 108, similar to the shown two lightguide for controlling the halogen shape LED illuminator 21L or the LED panel 28L of FIG. 5C.

Figure 7:
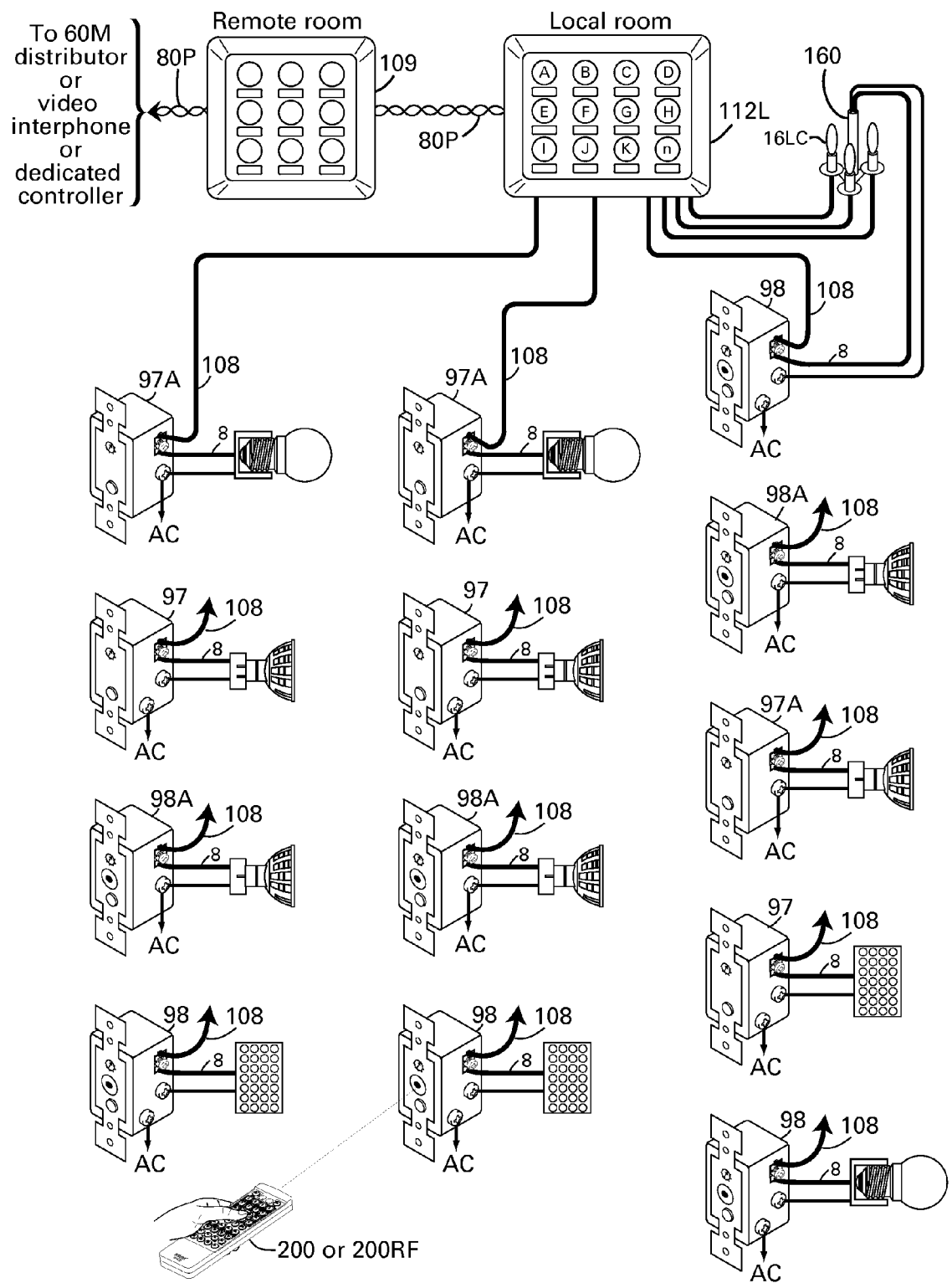
FIG. 7 is a perspective illustration of a larger system interconnection including plurality of local switches-controllers of FIGS. 6A~6D, keypads, including the connection to a system controller of the present invention.

FIG. 7 shows a local manual control of each individual LED illuminator via its switch-controller, the local control from the local room keypad 112L, the remote controlling within the local room (in line of sight) by an IR remote control 200, or via RF control 200RF from any of the rooms, the remote controlling via another keypad 109 from a remote room, and remotely or automatically as set from a dedicated system controller, the video interphone or the shopping terminal. The remote controls can be through the directly connected illuminator with switching-controlling and keypad devices, or via the system distributor 60M. In fact FIG. 7 shows the extreme simplicity and flexibility in controlling any number of LED illuminators via simple low cost lightguide network of the present invention.

In the example of FIG. 7, the entire illuminators shown in FIG. 7 that are connected via the respective switch-controller 97, 97A, 98 and 98A with the local room keypad 100, via the lightguide 108 (same as 8) are the only needed devices to switch and control all the lights of the local room. The remote control 200 or 200RF offer the added convenience, locally and from other rooms. The remote room keypad 109, such as in a master bed room, can be added as optional, but keypad 112L can be used alone, at which time the line 80P and the keypad 109, the distributor 60M and other controllers are not needed and not used.

As explained above, each individual LED illuminator can be operated manually via its switch-controller 97, 97A, 98 and 98A with or without connection to the local room keypad 112L. Yet, it is similarly possible to provide cascading keypads 109 in every room, the corridor and the kitchen for controlling any and all the illuminators in the residence or office and a similar or larger setup. The keypads can be programmed to switch "off" or "on" all the illuminator via a single key, or connect the system via the video interphone, the shopping terminal, or the dedicated controller and through the Internet to control the LED illuminators from far remote distances via the Internet and/or be programmed to switch on-off automatically at set times and days.

The shown lightguides 108 are same as the lightguide 8, which are shown in FIG. 7 to connect the LED illuminators to the switch controller. The lightguide 108 are shown connected to the keypad 112L which is an extension of the keypad disclosed in the referenced US patents and applications. The Keypad 112L is extended by adding n number of the RX-TX circuits 65 shown in FIG. 5 connected to I/O ports of the CPU (not shown) of the keypad 112L.

Figure 8:
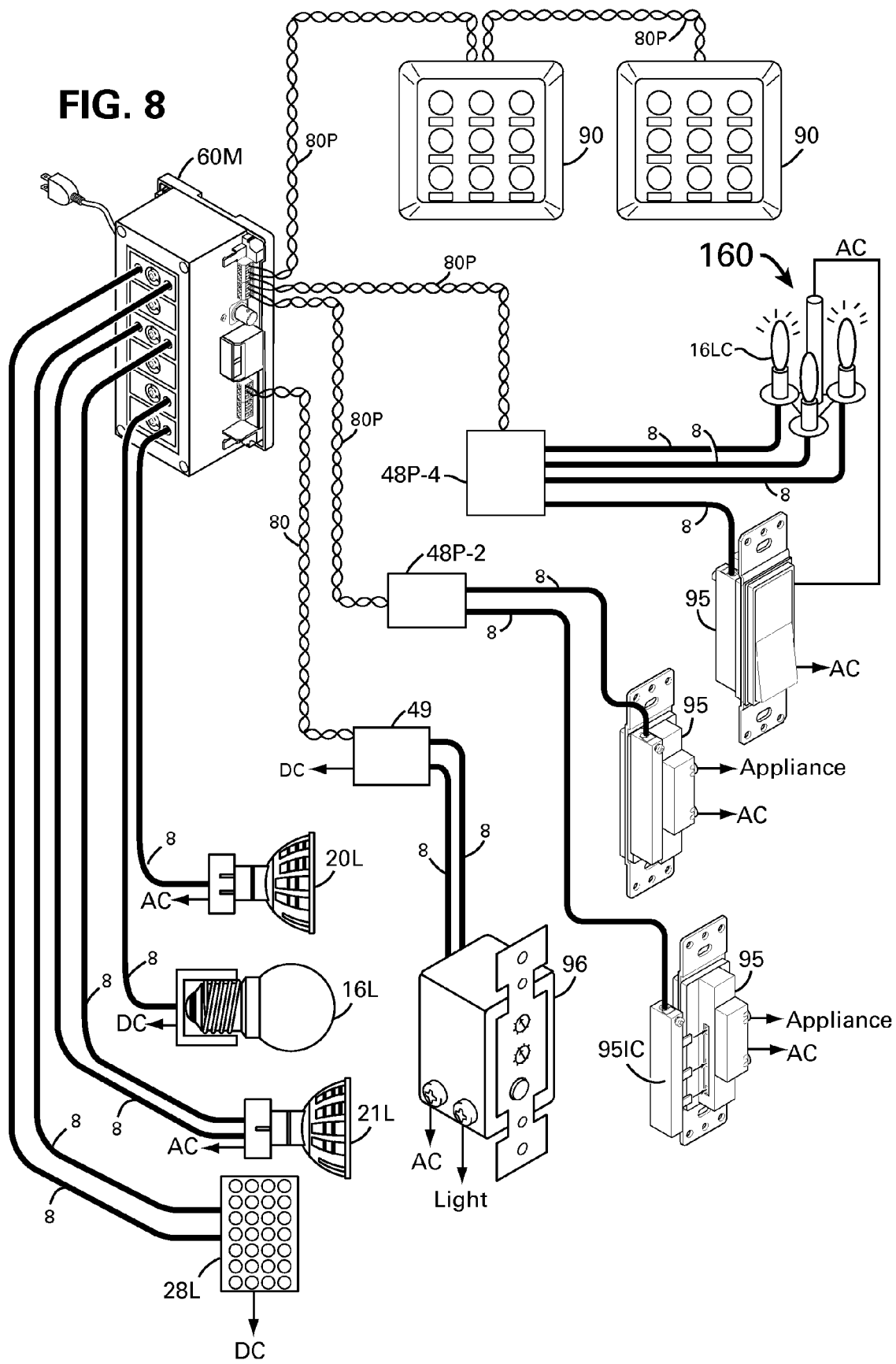
FIG. 8 is a perspective illustration of the home automation distributor, and the direct interconnecting of the lightguide cables with LED illuminators or light fixtures via lightguide converters of the present invention.

FIG. 8 shows the low voltage signal line system interconnections via twisted pairs 80P and 80 and the optical signal propagation via the single and the dual lightguides or fiber optic cables 8. The keypads 90 are shown connected in cascade via the twisted pair 80P, propagating two way communications with the distributor 60M including the power feed to the keypads, via the twisted pair 80P line. The keypads 90 are used for remotely controlling lights and other appliances and are disclosed with their circuits in the referenced U.S. applications.

The command converter 49 is shown connected via the twisted pair 80 for communicating two ways low voltage signals with the distributor 60M, for converting the low voltage signals to optical signals and optical signals to low voltage signals, using the RX-TX circuit 65, CPU 61 and wired data driver 69 or 69P, as shown in the distributor 60M block diagram of FIG. 5C.

The command converter 49 is installed in a given electrical box, powered by DC fed, for example, from the terminal 78-11 of FIG. 5C, ensuring that the electrical box is free from AC power wires and connections. It is connected as shown in FIG. 8 to a dimmer 96 (installed in another electrical box) via dual lightguides or fiber optic cables 8, thereby providing two way communications between the dimmer 96 and the system distributor and power supply 60M, with no electrical hazards and in total compliance with the building and the electrical codes.

The command converters 48P of FIG. 8 is shown connected to the system distributor and power supply 60M via a communication line 80P (twisted pair). The line 80P also feeds the DC power for operating the connected devices, such as the command converter 48P. The command converter 48P is shown connected to a switch assembly 95 via a single lightguide or fiber optic cable 8. In this arrangement, similar to the 49 command converter explained above, the command converter 48 is mounted into an electrical box, having no AC power connections, and the connection between the box of the command converter 48 and the box of the switch 95 is via a single lightguide or fiber optic cable 8 that off ers high insulation level and is fire retardant, posing no electrical or fire hazard and it fully complies with the building and the electrical codes.

The command converter 48P-4 shown is a four channels converter for communicating two way optical commands into four lightguide cables 8 with three, each shown attached to an individual LED candelabra bulb 16LC of the chandelier 160. The forth lightguide 8 is attached to a power switch combination 95. The switch 95 combines SPDT electrical switch and SPDT mechanical switch and as disclosed in the U.S. application Ser. No. 12/632,108, the switch 95 enables to switch the power on-off manually via the mechanical switch and remotely via the home automation network, including keypads, touch screens, and IR or RF remote controls for operating lights and other electrical appliances as shown in FIG. 8.

The converter 48P-4 provides for controlling each individual LED candelabra bulb 16LC via a selected illumination program and or switch on-off, or dim, or change the emitted color of each bulb 16LC individually and/or switch off the entire chandelier power via the switch 95. Though the lightguides 8 leading to the bulbs 16LC and to the switch 95 and the AC line from the switch 95 to the chandelier 160 are shown apart or separated, in practice they can be all fed through a common conduit, because the lightguides 8 are a total insulator and can be safely with no hazard be mixed with high voltage AC power wiring systems.

The command converter 48P-2 shown in FIG. 8 is a two channel converter for receiving a low voltage control signals and for propagating and responding to dual two way converted optical signals to illuminators or other appliances and switching devices. The shown 48P-2 converter in FIG. 8 is attached to two power switches 95, one is shown as a combined switch 95 referred to above, and the other switch is shown detached from its SPDT electric switch packaged IC 95IC.

The keypads 90 as disclosed in the referenced U.S. patents and applications include digital switches for assigning each of the keys its address and function, and any of the keys of the keypads 90 can be set to switch on-off and dim, or set a program or change the emitted color of an LED illuminator of the present invention and any other appliance's functions.

The optical receiver and transmitter circuits 65 (not shown) included in all the command converters shown 48, 48P, 49 and 49P are similar to the integrated circuit 65 including the optical transmitter 6T, the optical receiver 6R, the circuits TX65T and RX65R, the prism 6P, the integrated coupler 6TR and the dual accesses for dual lightguides of the distributor 60M shown in FIG. 5C. This enables to operate the dimmer 96 of FIG. 8 that is connected to the command converter 49 via dual lightguides 8 or the switches 95 and the each individual LED illuminators 16LC that are connected via the single lightguide cables 8.

It becomes clear that interconnecting the command converters via low voltage control lines 80P and 80 (with or without DC power feed) for converting electrical signals into light or optical signals for propagation via the lightguide or fiber optic cables for operating the LED illuminators and any other electrical appliances can be safely implemented at a low cost, yet provide highly efficient home automation system, including the control of the many illuminators used in homes, offices or business.

Further, the shown command converters 48 and 49 are connected to the LED illuminators directly or via switching devices powered by the AC line fully comply with the electric code requirements and the switching devices 95 or 96 can be mounted into electrical boxes and interconnected by the lightguides 8 that are a total insulator and electrically safe. The lightguides and/or the fiber optic cables are flame retardant and fully comply with the fire codes for building materials.

Figure 9A:
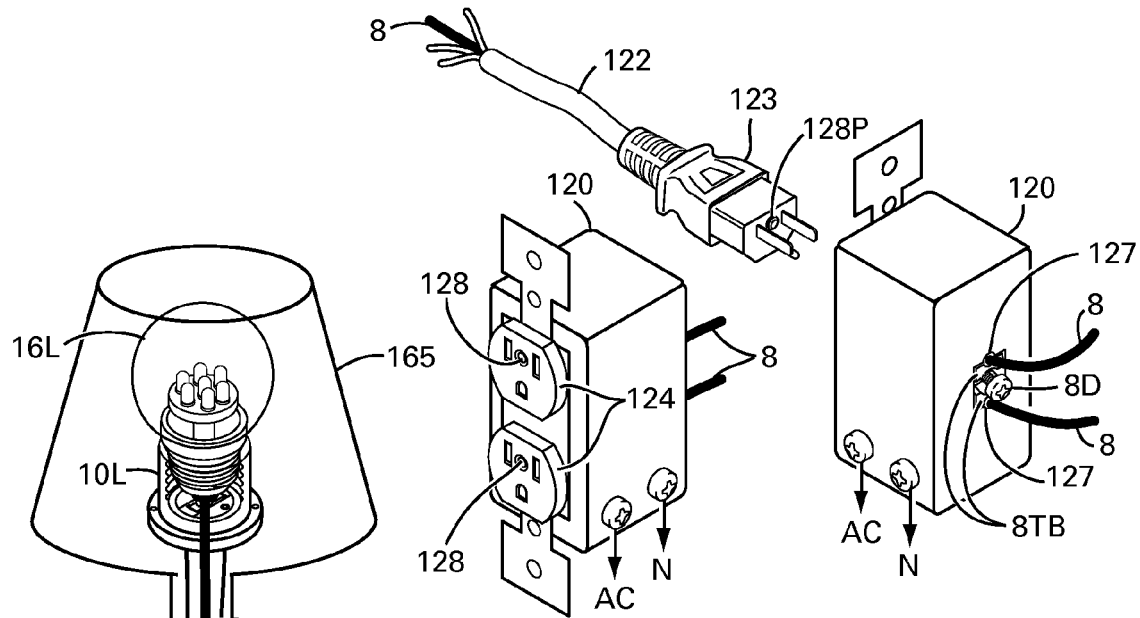
FIGS. 9A~9C are perspective views and cross sectional view of a lighting appliance connected and controlled via an AC outlet and cable assembly of the present invention.
Figure 9B:
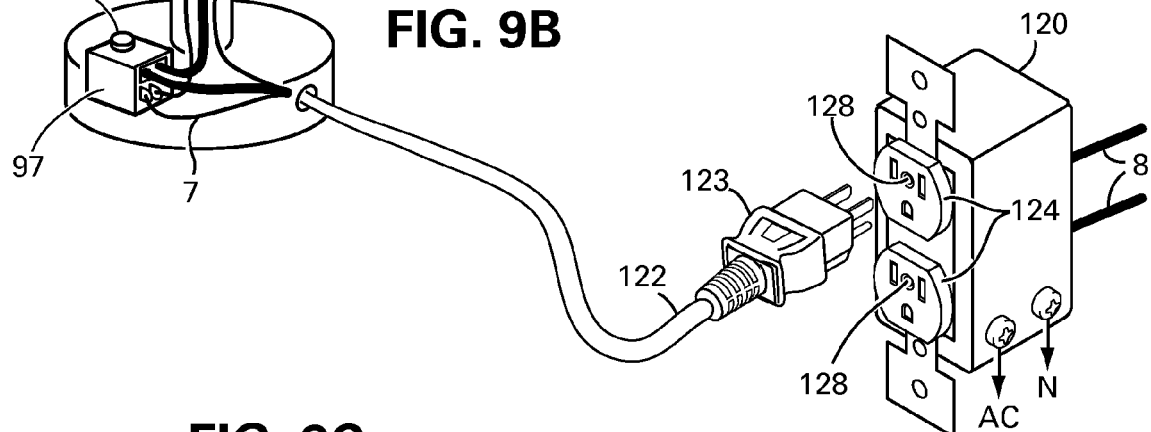
Figure 9C:
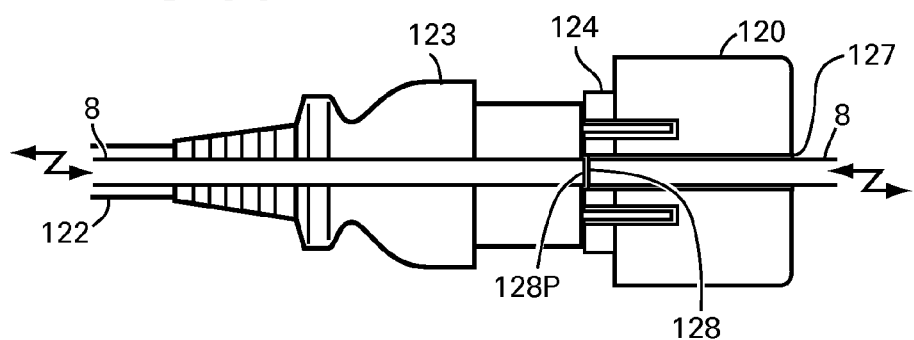

Shown in FIGS. 9A~9C are the introductions of a bisected lightguide 8 into an AC outlet 120 with optical lightguide accesses 128 to an AC power plug 123 and cable 122, including an optical lightguide access 128P at the power pin side of the plug.

FIG. 9A shows the front view of a standard power outlet 120 with dual power sockets 124, each include an optical lightguide access 128 that are the cut surfaces of the dual bisected lightguide cables 8 attached to the accesses 128 through the rear end entry 127 of the outlet unit 120 shown in the same FIG. 9A and are secured by the screw head 8D and the pressure tabs 8TB, similar to the shown tabs and screws of FIG. 3F explained above.

The power cable 122 including the lightguide 8 shown in FIG. 9B is a molded cable and plug 127, wherein the cut lightguide cable end which is the other bisected or cut surface of the optical path attached to a protruding circle surface of the front of the AC plug 123, which forms the access 128P. The access 128 of the socket 124 is a recessed circle that forms the access 128. Even though the cable 122 with the plug 123 is shown molded, an ordinary power plug can be made to accommodate lightguide with attachment and access, similar to the shown access 128P and a cable similar to 122 can be made to include the lightguide 8.

Both accesses 128 and 128P are mated pair, such that when the plug 123 is plugged into the socket 124 its protruding accesses 128P fitly mate with the indented access 128 placing the cut surface of the lightguide 8 of the outlet 120 and the cut surface of the lightguide 8 of the plug 123 at a very thin gap between them, in line for light or optical signal propagation.

Such thin gap, though reduces the signal level, permits to propagate coded commands and/or feed continuous light signals to switch on-off and control the desktop lamp 165 shown in FIG. 9B.

The desk lamp 165 includes the LED illuminator 16L, the bulb socket 10L and the switch-controller 97, 97A, 98 or 98A of FIG. 7. The switch-controller is mechanically constructed to fit the desk lamp base size and shape, but it is identical in its features, circuits and operation to the switch-controller 97 and 97A explained above. The bisected lightguides 8 attached to the outlet 120 shown in FIG. 9B can be connected to the keypad 112L of FIG. 7 or to the home automation distributor 60M or to the video interphone 72 of FIG. 5 and to other dedicated controllers for operating and for switching the desk lamp 165 remotely, including the use of IR or RF remote controls, touch screens such as included in the shopping terminal, or the keypads 90 or 109, or through the Internet shown in FIG. 5C.

A cross sectional illustration of the top view of the lightguides 8 mating in FIG. 9C shows clearly that the two bisected cuts of the lightguides are spaced at a distances that can practically be less than 2 mm, or less than 0.1 inch. As explained above lightguides are terminated by a guillotine cut, requiring no lapping or polishing and bisecting the lightguide by a guillotine cut enable the propagation of optical signals with minimal loss. The attenuation of the optical or light signal at such gap between the cut surfaces is about 10 dB 12 dB for a lightguide with core diameter of 1.0 mm, an equivalent to the attenuation of some 20~25 m (66~83 feet) lightguide cable length of same diameter (1.0 mm). This will limit the total maximum length of the bisected lightguide with such in-line gap, but does permit a sufficiently long lightguide cable, and well within the usable and practical distances between a command converter 48 or 49 or the home automation distributor 60M and the AC outlets 120, to be used.

Lightguide cables with a length of 25~30 m (80~100 feet) having a cut gap of up to 2~4 mm will provide two way optical signal propagation at 4.800 band, far above from what is needed to operate and control the table lamp 165 or other appliances, such as television shown in FIGS. 10A~10D.

Figure 11A:
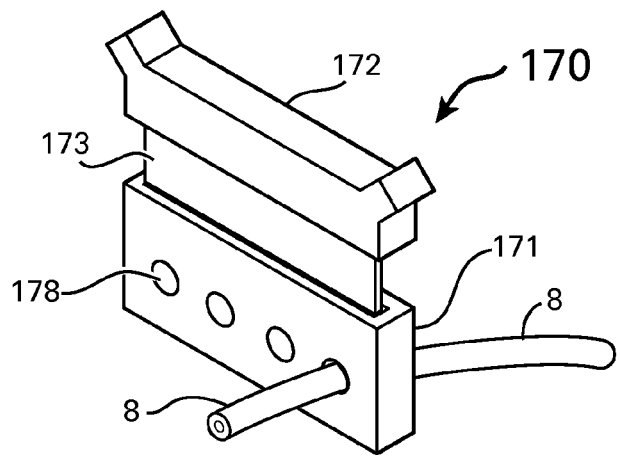
FIG. 11A is a perspective view of a guillotine cutter for the lightguides of the present invention.

Further, when an installed lightguide in conduit or plenum is found to be short and need to be extended, or when a lightguide cable is damaged and need to be cleaved and reattached, the physical attaching of cleanly cut surfaces by a sharp guillotine cutter 170 shown in FIG. 11A introduces a minimal optical losses of 1~3 dB. There are many ways to physically attach and bond together the two surfaces of a cleaved lightguide, such as using heat shrink tubes, inner bonding tubes and mating adapters.

Figure 11B:
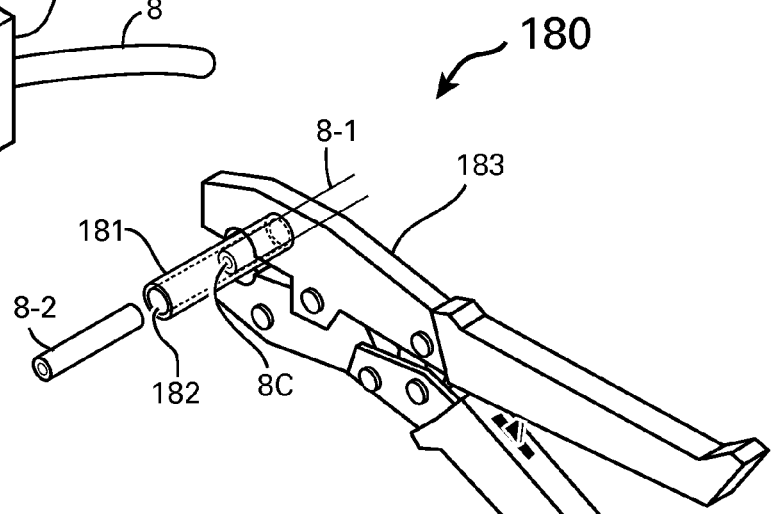
FIGS. 11B~11C are perspective views of a mating adapter for attaching cut ends of the lightguide of the present invention.

FIG. 11B shows a crimp type mating adapter 180 comprising tubular body 181 with a tight sized hole 182 for the cleaved cuts 8-1 and 8-2 to be inserted to physically mate the two surfaces 8C shown and crimp the two ends of the adapter body 181 by the crimping tool 183.

Figure 11C:
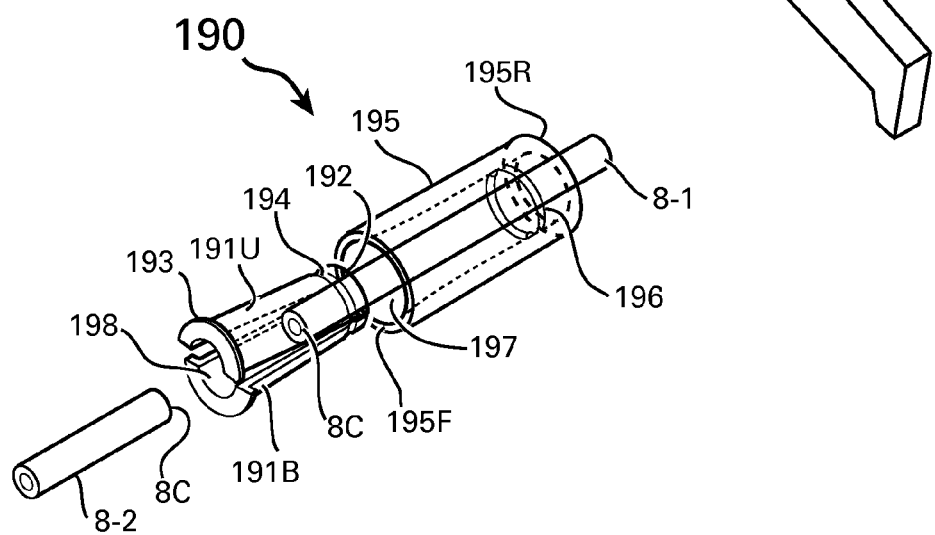

FIG. 11C shows a self-locking mating adapter 190 comprising two parts, the upper 191U and the bottom 191B jaws and the locking tube 195. The jaws 191U and 191B are pressured by the tapered hole 197 of the locking tube 195 to vise first the inserted cleaved end 8-1 via the rear entry 192. Inserting the cleaved lightguide through the opposite entry 98, mating the two surfaces 8C and the vising of the cleaved end 8-2 by sliding the locking tube all the way completes the mating of the cleaved cuts.

The shown stop ring 193 limits the lock tube forward movement, while the lock ring 196 snapping into the lock notch 194, locks the lock tube 195 into its vise position.

The different optical routs between a control device for operating, monitoring and controlling LED illuminators and other electrical appliance shown in the drawing and explained or discussed above may become confusing because of the different routes including the conversion of low voltage signals to optical signals.

The basic direct point to point rout is via non bisected lightguide connected between a control device and an LED illuminator or other appliance. A typical example of a point to point is a lightguide connection shown between the LED illuminator 16LC and the keypad 112L of FIG. 7.

Another basic direct point to point lightguide connection is the attaching of its one terminated end to a lightguide coupler access, such as access 6A of the LED illuminator 16L and the other terminated end to a lightguide coupler access of a control device. A direct point to point rout includes a stand alone control of LED illuminators such as between the switch-controller 97, 97A, 98 and 98A and the illuminator 16L as shown in FIGS. 6A~6D.

A distributed or re-propagated point to point routs are shown in FIG. 7 whereby all the shown switch-controllers re-propagate the optical signals propagated between the keypad 112L and the switch-controller. The optical signals are re-propagated to the LED illuminator and vice-versa, signals propagated between the switch-controller and the LED illuminator are re-propagated to the keypad.

The lightguides 108 and 8 connected to a switch-controller such as 97 are attached to a two way access and a lightguide coupler for converting two way optical signals for exchanging electrical signals with a CPU such as shown in FIG. 5C. The CPU feeds as programmed electrical signals via the same or the other lightguide coupler for communicating optical signals via lightguide 108 to the keypad 112L or 8 to the LED illuminators.

The converted point to point optical signals are also shown in FIG. 5C where the converters 48, 48P, 49 and 49P are shown to convert electrical signals and propagate optical signal via one or two lightguide cables that are attached between the command converters and the illuminators.

The bisected lightguide explained above and below is not directly connected between two end points. A point to point is the connection between a lightguide coupler of a control, a distributor or a converter with a lightguide coupler of an LED illuminator or of an electrical appliance. A bisected lightguide can connect only to one such point, to the control end or to the appliance end.

The cut surface of the bisected lightguide of a control end is to be attached to a bisected surface of a second or an extended lightguide that is attached to an access of an LED illuminator or of an electrical appliance, as shown in FIGS. 9A~9C and 10A~10D. The bisected lightguide therefore is terminated via the accesses 128 that are the surfaces of the bisected cuts. The bisected extended lightguide that is connected to the LED illuminator and/or the television 140 shown in FIGS. 10A~10D is the lightguide 8 included in the power cable 122. The extended lightguide is accessed via the plug 123 and the AC socket 125 for attachment to the lightguide coupler of the television 140.

The shown bisected lightguides in FIGS. 9A~9C and FIGS. 10A~10D can be tied to the many different electrical materials used for wiring electrical systems such as electrical boxes, conduits, sockets and plugs connected by different combinations of power wires and cables. The optical cables of the present invention can be mingled with the electrical wiring systems and therefore, the electrical system include bisected lightguides 8 and accesses for providing optical path between a control device and the LED illuminator or an electrical appliance jointly with the electrical feed.

The cleaved lightguides as explained below are not bisected for providing an access for attaching a second or an extended bisected lightguide discussed above, they are simply discussed here in connection with the repairing of a damaged lightguide and/or for extending its length. The mated cleaved lightguide is an in-line repair or extension of a lightguide to complete its point to point connection or for connecting an end point to a bisected access connection.

Shown in FIG. 10A is the power cable 122 and plug 123 attached to an LCD television set 140. The plug 123 is connected to the outlet 120 in the same way the table lamp 165 is connected. The television set 140 includes switch-controller 97, 97A, 98 and 98A (not shown) with the power on-off key 93 is shown for switching the television on-off manually, while at the same time any type of control commands including remote power on-off can be fed to the television set 140 via the lightguide 8.

Figure 2D:
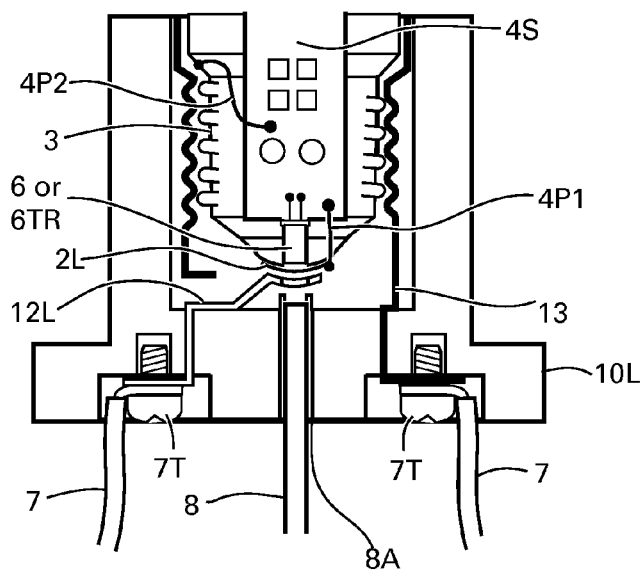

The lightguide included in the power cable 122 is attached to an access of a lightguide coupler inside the television 140 (not shown), the not shown lightguide coupler is similar to the shown accesses and lightguide coupler 6 or 6TR of the LED light bulb in FIGS. 2C and 2D and/or to any other lightguide attachments discussed above and in the referenced U.S. application Ser. Nos. 12/236,656 and 12/632,108. Similarly the television set can generate and feed back statuses to the system controller, in the same manner discussed above, including the current drain, the operating mode and many more.

FIG. 10B shows the power connection of the television via a molded cable combining the plug 123, the cable 122 and a cable in-line socket 125, which is a well known molded power cable for connecting PCs and A/V appliances to a power outlet shown in FIG. 10C. The molded power cable however includes an access 128 for the lightguide cable 8 at the front surface of its in-line socket 125. The lightguide included is accessed at its other terminated end through the plug 123 exactly as shown in FIG. 9C, wherein the mated molded cable will propagate an optical signal between the outlet 120 and the lightguide coupler 6 or 6TR through the optical access 6A of the power socket 125S of the television 140, same as explained and discussed above in connection with the lightguide couplers of the LED illuminators. This includes the receive only, transmit only and/or propagate the two way optical signals, along with feeding power to the appliances, such as the television.

The lightguide solution offers a low cost solution to otherwise complex, expensive, and restricted by the electrical and fire codes, rules and regulation. This harmonized interconnection and the two way optical commands via light guides can solve the complexity that have seriously held back the automation from penetrating into homes, multi apartment buildings, offices, shops, and any other illuminated institution, small and large, indoor and outdoor, including streetlights, sport stadiums and other structures.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for propagating optical signal jointly with electric power feed to at least one of LED illuminators and electrical appliances from control devices selected from a group comprising keypads, touch screens, switch-controllers, relay-controllers, lighting controllers, dedicated controllers, home automation controllers, video interphone monitors, shopping terminals, signal distributors, IR drivers, command converters and combinations thereof;

said optical signal is propagated via at least one optical cable selected from a group comprising lightguide, fiber optic and a combination thereof jointly with said electric power fed via at least one of materials selected from a group comprising power wires, power cables, power cable assembly with power plug, power cable assembly with power plug and socket, combination cable including said optical cable and power wires, said combination cable assembly with power plug and optical access, said combination cable assembly with power plug and socket each with optical access, electrical conduits, electrical boxes, power sockets, power sockets with optical access, power plugs, power outlets, power switches, power relays, current sensors, power adaptors, light bulb sockets, lamp assemblies and combinations thereof;

at least one of said control devices includes an optical transmitter with an optical first access and a first attachment for securing a terminated end of said optical cable to said first access and said at least one of LED illuminators and electrical appliances includes an optical receiver with an optical second access and a second attachment for securing one of the other terminated end and the last terminated end of a cascaded chain of said optical cable to said second access;

said optical signal is propagated from said transmitter to said receiver via one of a single stretch and a plurality of cuts of said optical cable, wherein said cuts are optically linked in said cascaded chain through at least one of said materials and a mating adaptor, wherein each of the ends of said cuts are terminated and linked through a mating combination selected from a group comprising an access in said materials, a terminated end of another cut in said materials and a terminated end of another cut in said mating adaptor, said method comprising the steps of:

a. terminating all the ends of one of said single stretch and said cuts for linking said cuts in said cascaded chain;

b. securing said one terminated end of one of said single stretch and said cascaded chain to said first access and said one of other terminated end and last terminated end to said second access;

c. connecting said at least one of LED illuminators and electrical appliance to said electric power via said materials; and d. propagating said optical signal selected from a group comprising control, commands, continuous on, pulse train and combinations thereof from said at least one of control devices to said at least one of LED illuminators and electrical appliances.

2. The method for propagating optical signal jointly with electric power feed according to claim 1, wherein said at least one of control devices further includes an optical receiver with a receive third access and a third attachment for securing one terminated end of a second said optical cable to said receive third access and said at least one of LED illuminators and electrical appliances further includes an optical transmitter with a transmit forth access and a forth attachment for securing the other terminated end of said second optical cable to said forth access for providing an optical path to propagate a returned optical data signal, said method comprising the further steps of:

a. terminating the ends of said second optical cable;

b. securing one terminated end of said second optical cable to said receive third access and the other terminated end to said transmit forth access; and c. propagating said returned optical data signals selected from a group comprising current drain, power status, program in process, command confirmation and combinations thereof.

3. The method for propagating optical signal jointly with electric power feed according to claim 1, wherein said at least one of control devices further includes an optical receiver and said at least one of LED illuminators and electrical appliances further includes an optical transmitter for propagating two way optical signals via said first access and said second access by one of an optical prism and integrating said optical receiver with said optical transmitter into an integrated two way lightguide coupler; and propagating said two way optical data signals including a returned data selected from a group comprising current drain, power status, program in process, command confirmation and combinations thereof.

4. The method for propagating optical signal jointly with electric power feed according to claim 1, wherein said second access for receiving optical signal is included in about the center of the rear of a threaded light bulb base of said LED illuminator and said optical cable is accessed through one of a hole and a cutout in the rear body and contact of a matching light bulb socket about the longitudinal axis of its thread.

5. The method for propagating optical signal jointly with electric power feed according to claim 3, wherein said second access is included in about the center of the rear of a threaded light bulb base of said LED illuminator and said optical cable is accessed through one of a hole and a cutout in the rear body and contact of a matching light bulb socket about the longitudinal axis of its thread.

6. The method for propagating optical signal jointly with electric power feed according to claim 1, wherein said second access is included in the rear of a plug-in light bulb base of said LED illuminator and said optical cable is accessed through one of a hole and a cutout in a matching plug-in light bulb socket.

7. The method for propagating optical signal jointly with electric power feed according to claim 2, wherein said second access and said forth access are included in the rear of a plug-in light bulb base of said LED illuminator and said optical cable and said second optical cable are accessed through a structure selected from a group comprising holes, cutouts and combinations thereof in a matching plug-in light bulb socket.

8. The method for propagating optical signal jointly with electric power feed according to claim 3, wherein said second access is included in the rear of a plug-in light bulb base of said LED illuminator and said optical cable is accessed through one of a hole and a cutout in a matching plug-in light bulb socket.

9. The method for propagating optical signal jointly with electric power feed according to claim 1, wherein at least one of said power sockets with optical access for linking said transmitter optical signals and said at least one of LED illuminators and electrical appliances is connected to one of said combination cable assembly with power plug and optical access and said terminated end of said optical cable included in said combination cable assembly is attached to said second access for receiving said optical signals, said method comprising the further step of;

mating said power plug with optical access of said combination cable assembly with said power socket with optical access for feeding said electric power and for propagating said transmitter optical signal to said at least one of LED illuminators and electrical appliances.

10. The method for propagating optical signal jointly with electric power feed according to claim 3, wherein at least one of said power sockets with optical access for linking said two way optical signals and said at least one of LED illuminators and electrical appliances is connected to one of said combination cable assembly with power plug and optical access and said terminated end of said optical cable included in said combination cable assembly is attached to said second access for propagating said two way optical signals, said method comprising the further step of;

mating said power plug with optical access of said combination cable assembly with said power socket with optical access for feeding said electric power and for propagating said two way optical signals to and from said at least one of LED illuminators and electrical appliances.

11. The method for propagating optical signal jointly with electric power feed according to claim 1, wherein at least one of said power socket with optical access for linking said transmit optical signal and said at least one of LED illuminators and electrical appliances includes a combination plug-in with access and is mated with said combination cable assembly with power plug and socket each with optical access for optically linking said access of said power socket with said access of said combination plug-in, said method comprising the further steps of;

mating said power plug with optical access of said combination cable assembly with said power socket with optical access for feeding said electric power and for propagating said optical signal to said at least one of LED illuminators and electrical appliances.

12. The method for propagating optical signal jointly with electric power feed according to claim 3, wherein at least one of said power sockets with optical access for linking said two way optical signals and said at least one of LED illuminators and electrical appliances includes a combination plug-in with access and is mated with said combination cable assembly with power plug and socket each with optical access for optically linking said access of said power socket with said access of said combination plug-in, said method comprising the further steps of;

mating said power plug with optical access of said combination cable assembly with said power socket with optical access for feeding said electric power and for propagating said two way optical signal to and from said at least one of LED illuminators and electrical appliances.

13. The method for propagating optical signal jointly with electric power feed according to claim 1, wherein at least one of a selected group of said materials comprising power socket, power outlet, power switch, power relay, semiconductor power switch, dimmer, current sensor, power adapter, power supply, bulb socket, lamp assembly and combinations thereof include one optical cascade receiver and one optical cascade transmitter with dual accesses and dual attachments for securing two terminated ends of two adjacent said cuts linked in said cascaded chain to said dual accesses; and wherein said optical signal received by said cascade receiver is processed and regenerated through said cascade transmitter to the other end of said cascaded chain.

14. The method for propagating optical signal jointly with electric power feed according to claim 3, wherein at least one of a selected group of said materials comprising power socket, power outlet, power switch, power relay, semiconductor power switch, dimmer, current sensor, power adapter, power supply, bulb socket, lamp assembly and combinations thereof include dual optical transceivers with dual accesses and dual attachments for securing two terminated ends of two adjacent said cuts linked in said cascaded chain to said dual accesses; and wherein said optical signal received by one of said transceivers is processed and regenerated to the other end of said cascaded chain via the other transceiver.

15. The method for propagating optical signal jointly with electric power feed according to claim 1, wherein said mating adapter is selected from a group comprising inner bonded tube, heat shrink tube, crimping tube and mechanically lock tube.

16. An apparatus for propagating optical signal jointly with electric power feed to at least one of LED illuminators and electrical appliances from control devices selected from a group comprising keypads, touch screens, switch-controllers, relay-controllers, lighting controllers, dedicated controllers, home automation controllers, video interphone monitors, shopping terminals, signal distributors, IR drivers, command converters and combinations thereof;

said optical signal is propagated via at least one optical cable selected from a group comprising lightguide, fiber optic and a combination thereof jointly with said electric power fed via materials selected from a group comprising power wires, power cables, power cable assembly with power plug, power cable assembly with power plug and socket, combination cable including said optical cable and power wires, said combination cable assembly with power plug and optical access, said combination cable assembly with power plug and socket each with optical access, electrical conduit, electrical box, power socket, power socket with optical access, power plug, power outlet, power switch, power relay, semiconductor power switch, dimmer, current sensor, power adapter, power supply, light bulb socket, lamp assembly and combinations thereof;

at least one of said control devices includes an optical transmitter with an optical first access and a first attachment for securing a terminated end of said optical cable to said first access and said at least one of LED illuminators and electrical appliances includes an optical receiver with an optical second access and a second attachment for securing one of the other terminated end and the last terminated end of a cascaded chain of said optical cable to said second access;

said optical signal selected from a group comprising control, commands, continuous on, pulse train and combinations thereof from at least one of said control devices to said at least one of LED illuminators and electrical appliances is propagated from said transmitter to said receiver via one of a single stretch and a plurality of cuts of said optical cable, wherein said cuts are optically linked in said cascaded chain through at least one of said materials and a mating adaptor; and each of the ends of said cuts is terminated and linked through a mating combination selected from a group comprising an access in said materials, a terminated end of another cut in said materials and a terminated end of another cut in said mating adaptor.

17. The apparatus for propagating optical signal jointly with electric power feed according to claim 16, wherein said at least one of control devices further includes an optical receiver with a receive third access and a third attachment for securing one terminated end of a second said optical cable and said at least one of LED illuminators and electrical appliances further includes an optical transmitter with a transmit forth access and a forth attachment for securing the other terminated end of said second optical cable for providing an optical path to propagate a returned optical data signal selected from a group comprising current drain, power status, program in process, command confirmation and combinations thereof.

18. The apparatus for propagating optical signal jointly with electric power feed according to claim 16, wherein said at least one of control devices further includes an optical receiver and said at least one of LED illuminators and electrical appliances further includes an optical transmitter for propagating two way optical signals via said first access and said second access by one of an optical prism and integrating said optical receiver with said optical transmitter into an integrated two way lightguide coupler;

and wherein the propagated said two way optical data signals include a returned data selected from a group comprising current drain, power status, program in process, command confirmation and combinations thereof.

19. The apparatus for propagating optical signal jointly with electric power feed according to claim 16, wherein said second access is included in the center of the rear of a threaded light bulb base of said LED illuminator and said optical signal is accessed through one of a hole and a cutout in the rear body and contact of a matching light bulb socket about the longitudinal axis of its thread.

20. The apparatus for propagating optical signal jointly with electric power feed according to claim 18, wherein said second access is included in the center of the rear terminal of a threaded light bulb base of said LED illuminator and said optical signal is accessed through one of a hole and a cutout in the rear body and contact of a matching light bulb socket about the longitudinal axis of its thread.

21. The apparatus for propagating optical signal jointly with electric power feed according to claim 16, wherein said second access is included in the rear of a plug-in light bulb base of said LED illuminator and said optical cable is accessed through one of a hole and a cutout in a matching plug-in light bulb socket.

22. The apparatus for propagating optical signal jointly with electric power feed according to claim 17, wherein said second access and said fourth access are included in the rear of a plug-in light bulb base of said LED illuminator and said optical cable and said second optical cable are accessed through a structure selected from a group comprising holes, cutouts and combination thereof in a matching plug-in light bulb socket.

23. The apparatus for propagating optical signal jointly with electric power feed according to claim 18, wherein said second access is included in the rear of a plug-in light bulb base of said LED illuminator and said optical cable is accessed through one of a hole and a cutout in a matching plug-in light bulb socket.

24. The apparatus for propagating optical signal jointly with electric power feed according to claim 16, wherein at least one of said power sockets with optical access for linking said transmitter optical signals and said at least one of LED illuminators and electrical appliances is connected to one of said combination cable assembly with power plug and optical access and said terminated end of said optical cable included in said combination cable assembly is attached to said second access for receiving said optical signals; and said power plug with optical access of said combination cable assembly is mated with said power socket with optical access for feeding said electric power and for propagating said transmitter optical signal to said at least one of LED illuminators and electrical appliances.

25. The apparatus for propagating optical signal jointly with electric power feed according to claim 18, wherein at least one of said power sockets with optical access for linking said two way optical signals and said at least one of LED illuminators and electrical appliances is connected to one of said combination cable assembly with power plug and optical access and said terminated end of said optical cable included in said combination cable assembly is attached to said second access for propagating said two way optical signals; and wherein said power plug with optical access of said combination cable assembly is mated with said power socket with optical access for feeding said electric power and for propagating said two way optical signals to and from said at least one of LED illuminators and electrical appliances.

26. The apparatus for propagating optical signal jointly with electric power feed according to claim 16, wherein at least one of said power socket with optical access for linking said transmitter optical signal and said at least one of LED illuminators and electrical appliances includes a combination plug-in with access and is mated with said combination cable assembly with power plug and socket each with optical access for optically linking said access of said power socket with said access of said combination plug-in through said combination cable assembly; and wherein said power plug with optical access of said combination cable assembly is mated with said power socket with optical access for feeding said electric power and for propagating said transmitter optical signal to said at least one of LED illuminators and electrical appliances.

27. The apparatus for propagating optical signal jointly with electric power feed according to claim 18, wherein at least one of said power sockets with optical access for linking said two way optical signals and said at least one of LED illuminators and electrical appliances includes a combination plug-in with access and is mated with said combination cable assembly with power plug and socket each with optical access for optically linking said access of said power socket with said access of said combination plug-in through said combination cable assembly; and wherein said power plug with optical access of said combination cable assembly is mated with said power socket for feeding said electric power and for propagating said two way optical signal to and from said at least one of LED illuminators and electrical appliances.

28. The apparatus for propagating optical signal jointly with electric power feed according to claim 16, wherein at least one of a selected group of said materials comprising power socket, power outlet, power switch, power relay, semiconductor power switch, dimmer, current sensor, power adapter, power supply, bulb socket, lamp assembly and combinations thereof includes one optical cascade receiver and one optical cascade transmitter with dual accesses and dual attachments for securing two terminated ends of two adjacent said cuts linked in said cascaded chain to said dual accesses; and wherein said optical signal received by said cascade receiver is processed and regenerated through said cascade transmitter to the other end of said cascaded chain.

29. The apparatus for propagating optical signal jointly with electric power feed according to claim 18, wherein at least one of a selected group of said materials comprising power socket, power outlet, power switch, power relay, semiconductor power switch, dimmer, current sensor, power adapter, power supply, bulb socket, lamp assembly and combinations thereof includes dual optical transceivers with dual accesses and dual attachments for securing two terminated ends of two adjacent said cuts linked in said cascaded chain; and wherein said optical signal received by said transceivers is processed and regenerated to the other end of said cascaded chain via the other transceiver.

30. The apparatus for propagating optical signal jointly with electric power feed according to claim 16, wherein said mating adaptor is selected from a group comprising inner bonded tube, heat shrink tube, crimping tube and mechanically lock tube.

* * * * *